US009866609B2

(12) United States Patent
Sarosi et al.

(10) Patent No.: US 9,866,609 B2
(45) Date of Patent: Jan. 9, 2018

(54) METHODS AND APPARATUS FOR PREMISES CONTENT DISTRIBUTION

(75) Inventors: George W. Sarosi, Niwot, CO (US); Chris Cholas, Frederick, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 628 days.

(21) Appl. No.: 12/480,591

(22) Filed: Jun. 8, 2009

(65) Prior Publication Data

US 2010/0312826 A1 Dec. 9, 2010

(51) Int. Cl.
H04L 29/06 (2006.01)

(52) U.S. Cl.
CPC ........ H04L 65/605 (2013.01); H04L 65/4084 (2013.01)

(58) Field of Classification Search
USPC ................ 709/203, 212, 213, 217, 229, 231
See application file for complete search history.

(56) References Cited

U.S. PATENT DOCUMENTS

| | | | |
|---|---|---|---|
| RE35,651 E | 11/1997 | Bradley et al. | |
| 5,734,380 A | 3/1998 | Adams et al. | |
| 5,793,410 A | 8/1998 | Rao | |
| 5,815,662 A | 9/1998 | Ong | |
| 6,105,134 A | 8/2000 | Pinder et al. | |
| 6,124,878 A | 9/2000 | Adams et al. | |
| 6,167,432 A | 12/2000 | Jiang | |
| 6,175,856 B1 | 1/2001 | Riddle | |
| 6,216,152 B1 | 4/2001 | Wong et al. | |
| 6,219,710 B1 | 4/2001 | Gray et al. | |
| 6,252,964 B1 | 6/2001 | Wasilewski et al. | |
| 6,256,393 B1 | 7/2001 | Safadi et al. | |
| 6,337,715 B1 | 1/2002 | Inagaki et al. | |
| 6,463,508 B1 | 10/2002 | Wolf et al. | |
| 6,516,412 B2 | 2/2003 | Wasilewski et al. | |
| 6,594,699 B1 * | 7/2003 | Sahai ................ H04L 29/06027 709/228 |

(Continued)

FOREIGN PATENT DOCUMENTS

| | | |
|---|---|---|
| CA | 2643806 C | 6/2013 |
| WO | WO-0110125 A1 | 2/2001 |
| WO | WO-2004008693 A1 | 1/2004 |

OTHER PUBLICATIONS

Wikipedia, Digital Video Recorder, pp. 1-17.*

Primary Examiner — Backhean Tiv
(74) Attorney, Agent, or Firm — Gazdzinski & Associates, PC

(57) ABSTRACT

Apparatus and methods for transfer and management of protected content in a network. In one embodiment, the apparatus comprises server and renderer devices including, for example, consumer premise equipment (CPE) having a content handler application adapted to run thereon. The content handler directs requests for content, directs searches of a device's storage, and directs transfers of content into the device as well as within the device. The content handler may, in another embodiment, be adapted to include a scheduler entity which maintains a schedule of upcoming content, and is adapted to maintain and manage requests for the upcoming content by reserving tuner resources. The content handler may be further adapted to implement authentication and authorization procedures.

16 Claims, 18 Drawing Sheets

(56) References Cited

U.S. PATENT DOCUMENTS

| | | | |
|---|---|---|---|
| 6,651,103 B1 | 11/2003 | Markowitz et al. | |
| 6,725,459 B2 | 4/2004 | Bacon | |
| 6,728,269 B1 | 4/2004 | Godwin et al. | |
| 6,728,840 B1 | 4/2004 | Shatil et al. | |
| 6,745,245 B1 | 6/2004 | Carpenter | |
| 6,772,435 B1* | 8/2004 | Thexton | H04N 7/16 348/E7.054 |
| 6,799,196 B1 | 9/2004 | Smith | |
| 6,839,757 B1* | 1/2005 | Romano | H04L 67/16 709/226 |
| 6,868,439 B2 | 3/2005 | Basu et al. | |
| 6,948,183 B1 | 9/2005 | Peterka | |
| 6,961,430 B1 | 11/2005 | Gaske et al. | |
| 6,981,045 B1 | 12/2005 | Brooks | |
| 6,985,934 B1 | 1/2006 | Armstrong et al. | |
| 7,010,801 B1 | 3/2006 | Jerding et al. | |
| 7,024,461 B1 | 4/2006 | Janning et al. | |
| 7,027,460 B2 | 4/2006 | Iyer et al. | |
| 7,039,116 B1 | 5/2006 | Zhang et al. | |
| 7,039,169 B2 | 5/2006 | Jones | |
| 7,039,614 B1 | 5/2006 | Candelore | |
| 7,039,938 B2 | 5/2006 | Candelore | |
| 7,058,387 B2 | 6/2006 | Kumar et al. | |
| 7,085,839 B1 | 8/2006 | Baugher et al. | |
| 7,088,910 B2* | 8/2006 | Potrebic | G11B 27/036 386/291 |
| 7,089,577 B1 | 8/2006 | Rakib et al. | |
| 7,093,272 B1 | 8/2006 | Shah-Nazaroff et al. | |
| 7,103,906 B1 | 9/2006 | Katz et al. | |
| 7,107,462 B2 | 9/2006 | Fransdonk | |
| 7,127,619 B2 | 10/2006 | Unger et al. | |
| 7,133,837 B1 | 11/2006 | Barnes, Jr. | |
| 7,174,385 B2* | 2/2007 | Li | H04L 65/4084 709/228 |
| 7,178,161 B1 | 2/2007 | Fristoe et al. | |
| 7,181,010 B2 | 2/2007 | Russ et al. | |
| 7,194,756 B2 | 3/2007 | Addington et al. | |
| 7,200,788 B2 | 4/2007 | Hiraki et al. | |
| 7,203,940 B2 | 4/2007 | Barmettler et al. | |
| 7,216,265 B2 | 5/2007 | Hughes et al. | |
| 7,225,164 B1 | 5/2007 | Candelore et al. | |
| 7,225,458 B2 | 5/2007 | Klauss et al. | |
| 7,254,608 B2 | 8/2007 | Yeager et al. | |
| 7,257,650 B2 | 8/2007 | Maciesowicz | |
| 7,266,198 B2 | 9/2007 | Medvinsky | |
| 7,266,611 B2 | 9/2007 | Jabri et al. | |
| 7,266,726 B1 | 9/2007 | Ladd et al. | |
| 7,299,290 B2 | 11/2007 | Karpoff | |
| 7,305,691 B2 | 12/2007 | Cristofalo | |
| 7,325,073 B2 | 1/2008 | Shao et al. | |
| 7,346,917 B2* | 3/2008 | Gatto | G06Q 30/06 348/E5.004 |
| 7,370,120 B2 | 5/2008 | Kirsch et al. | |
| 7,376,386 B2 | 5/2008 | Phillips et al. | |
| 7,403,618 B2 | 7/2008 | Van Rijnsoever et al. | |
| 7,434,245 B1 | 10/2008 | Shiga et al. | |
| 7,602,820 B2 | 10/2009 | Helms et al. | |
| 7,617,516 B2 | 11/2009 | Huslak et al. | |
| 7,689,995 B1* | 3/2010 | Francis | H04N 21/4147 718/104 |
| 7,690,020 B2 | 3/2010 | Lebar | |
| 7,720,986 B2* | 5/2010 | Savoor et al. | 709/231 |
| 7,721,313 B2* | 5/2010 | Barrett | 725/89 |
| 7,757,251 B2 | 7/2010 | Gonder et al. | |
| 7,779,097 B2* | 8/2010 | Lamkin et al. | 709/223 |
| 7,805,741 B2* | 9/2010 | Yeh | 725/37 |
| 7,917,008 B1* | 3/2011 | Lee | H04N 5/76 386/291 |
| 8,170,065 B2 | 5/2012 | Hasek et al. | |
| 8,291,453 B2* | 10/2012 | Boortz | H04N 5/44543 725/135 |
| 8,359,351 B2* | 1/2013 | Istvan | H04N 5/44543 709/203 |
| 8,516,533 B2* | 8/2013 | Davis | H04N 21/482 725/115 |
| 8,634,703 B1* | 1/2014 | Barton | H04N 21/47202 386/261 |
| 8,843,973 B2* | 9/2014 | Morrison | H04N 7/17336 725/104 |
| 2002/0019984 A1 | 2/2002 | Rakib | |
| 2002/0032754 A1 | 3/2002 | Logston et al. | |
| 2002/0049980 A1 | 4/2002 | Hoang | |
| 2002/0053082 A1 | 5/2002 | Weaver et al. | |
| 2002/0059619 A1 | 5/2002 | Lebar | |
| 2002/0100059 A1 | 7/2002 | Buehl et al. | |
| 2002/0147771 A1 | 10/2002 | Traversat et al. | |
| 2002/0152299 A1 | 10/2002 | Traversat et al. | |
| 2002/0162109 A1 | 10/2002 | Shteyn | |
| 2002/0174430 A1* | 11/2002 | Ellis | H04N 5/44543 725/46 |
| 2002/0196939 A1 | 12/2002 | Unger et al. | |
| 2003/0021412 A1 | 1/2003 | Candelore et al. | |
| 2003/0025832 A1 | 2/2003 | Swart et al. | |
| 2003/0056217 A1 | 3/2003 | Brooks | |
| 2003/0074565 A1 | 4/2003 | Wasilewski et al. | |
| 2003/0088876 A1 | 5/2003 | Mao et al. | |
| 2003/0095791 A1 | 5/2003 | Barton et al. | |
| 2003/0118014 A1 | 6/2003 | Iyer et al. | |
| 2003/0135860 A1 | 7/2003 | Dureau | |
| 2003/0161473 A1 | 8/2003 | Fransdonk | |
| 2003/0217365 A1 | 11/2003 | Caputo | |
| 2003/0235393 A1* | 12/2003 | Boston | H04N 5/76 386/295 |
| 2003/0237090 A1* | 12/2003 | Boston | H04N 5/76 725/37 |
| 2004/0045030 A1 | 3/2004 | Reynolds et al. | |
| 2004/0101271 A1* | 5/2004 | Boston | G11B 19/00 386/295 |
| 2004/0103437 A1 | 5/2004 | Allegrezza et al. | |
| 2004/0123313 A1 | 6/2004 | Koo et al. | |
| 2004/0181800 A1 | 9/2004 | Rakib et al. | |
| 2004/0187150 A1 | 9/2004 | Gonder et al. | |
| 2004/0193648 A1 | 9/2004 | Lai et al. | |
| 2004/0193704 A1 | 9/2004 | Smith | |
| 2004/0261114 A1 | 12/2004 | Addington et al. | |
| 2004/0261116 A1 | 12/2004 | McKeown et al. | |
| 2004/0267880 A1 | 12/2004 | Patiejunas | |
| 2004/0267965 A1 | 12/2004 | Vasudevan et al. | |
| 2005/0039206 A1 | 2/2005 | Opdycke | |
| 2005/0050160 A1 | 3/2005 | Upendran et al. | |
| 2005/0060758 A1 | 3/2005 | Park | |
| 2005/0071669 A1 | 3/2005 | Medvinsky | |
| 2005/0071882 A1 | 3/2005 | Rodriguez et al. | |
| 2005/0076092 A1* | 4/2005 | Chang | G06F 21/10 709/217 |
| 2005/0097598 A1 | 5/2005 | Pedlow et al. | |
| 2005/0108529 A1 | 5/2005 | Juneau | |
| 2005/0108769 A1* | 5/2005 | Arnold et al. | 725/115 |
| 2005/0114900 A1* | 5/2005 | Ladd | H04L 12/2805 725/100 |
| 2005/0125528 A1 | 6/2005 | Burke et al. | |
| 2005/0135476 A1 | 6/2005 | Gentric et al. | |
| 2005/0210510 A1* | 9/2005 | Danker | H04N 5/44543 725/52 |
| 2005/0289618 A1 | 12/2005 | Hardin | |
| 2006/0010075 A1 | 1/2006 | Wolf | |
| 2006/0020984 A1 | 1/2006 | Ban et al. | |
| 2006/0036750 A1 | 2/2006 | Ladd et al. | |
| 2006/0047957 A1 | 3/2006 | Helms et al. | |
| 2006/0050784 A1 | 3/2006 | Lappalainen et al. | |
| 2006/0059098 A1 | 3/2006 | Major et al. | |
| 2006/0059342 A1 | 3/2006 | Medvinsky et al. | |
| 2006/0062059 A1 | 3/2006 | Smith et al. | |
| 2006/0064728 A1 | 3/2006 | Son et al. | |
| 2006/0073843 A1 | 4/2006 | Aerrabotu et al. | |
| 2006/0080408 A1* | 4/2006 | Istvan | G06F 17/30861 709/219 |
| 2006/0084417 A1 | 4/2006 | Melpignano et al. | |
| 2006/0085824 A1 | 4/2006 | Bruck et al. | |
| 2006/0088063 A1 | 4/2006 | Hartung et al. | |

(56) References Cited

U.S. PATENT DOCUMENTS

| | | | |
|---|---|---|---|
| 2006/0117374 A1* | 6/2006 | Kortum | H04N 5/782 725/139 |
| 2006/0127039 A1 | 6/2006 | Van Stam | |
| 2006/0130107 A1 | 6/2006 | Gonder | |
| 2006/0130113 A1 | 6/2006 | Carlucci et al. | |
| 2006/0133398 A1 | 6/2006 | Choi et al. | |
| 2006/0133644 A1 | 6/2006 | Wells et al. | |
| 2006/0140584 A1* | 6/2006 | Ellis | G11B 27/005 386/238 |
| 2006/0171390 A1 | 8/2006 | La Joie | |
| 2006/0173783 A1* | 8/2006 | Marples et al. | 705/51 |
| 2006/0212906 A1 | 9/2006 | Cantalini | |
| 2006/0218601 A1 | 9/2006 | Michel | |
| 2006/0218604 A1 | 9/2006 | Riedl | |
| 2006/0248553 A1 | 11/2006 | Mikkelson et al. | |
| 2006/0256376 A1 | 11/2006 | Hirooka | |
| 2006/0271946 A1 | 11/2006 | Woundy et al. | |
| 2006/0291506 A1 | 12/2006 | Cain | |
| 2007/0022459 A1 | 1/2007 | Gaebel et al. | |
| 2007/0047449 A1 | 3/2007 | Berger et al. | |
| 2007/0053293 A1 | 3/2007 | McDonald et al. | |
| 2007/0061818 A1 | 3/2007 | Williams et al. | |
| 2007/0076728 A1 | 4/2007 | Rieger et al. | |
| 2007/0078910 A1* | 4/2007 | Bopardikar | 707/204 |
| 2007/0094691 A1 | 4/2007 | Gazdzinski | |
| 2007/0101157 A1 | 5/2007 | Faria | |
| 2007/0104456 A1* | 5/2007 | Craner | 386/83 |
| 2007/0106805 A1* | 5/2007 | Marples | G06Q 30/06 709/229 |
| 2007/0121678 A1 | 5/2007 | Brooks et al. | |
| 2007/0124781 A1 | 5/2007 | Casey et al. | |
| 2007/0130581 A1 | 6/2007 | Del Sesto et al. | |
| 2007/0153820 A1 | 7/2007 | Gould | |
| 2007/0156539 A1 | 7/2007 | Yates | |
| 2007/0157234 A1 | 7/2007 | Walker | |
| 2007/0162927 A1 | 7/2007 | Ramaswamy et al. | |
| 2007/0204300 A1 | 8/2007 | Markley et al. | |
| 2007/0204311 A1 | 8/2007 | Hasek et al. | |
| 2007/0204314 A1 | 8/2007 | Hasek et al. | |
| 2007/0217436 A1 | 9/2007 | Markley | |
| 2007/0241176 A1 | 10/2007 | Epstein et al. | |
| 2007/0250872 A1 | 10/2007 | Dua | |
| 2007/0250880 A1 | 10/2007 | Hainline | |
| 2007/0271386 A1 | 11/2007 | Kurihara et al. | |
| 2007/0276925 A1 | 11/2007 | LaJoie | |
| 2008/0022012 A1 | 1/2008 | Wang | |
| 2008/0040403 A1* | 2/2008 | Hayashi | G11B 27/32 |
| 2008/0066112 A1 | 3/2008 | Bailey et al. | |
| 2008/0098212 A1 | 4/2008 | Helms | |
| 2008/0098446 A1 | 4/2008 | Seckin et al. | |
| 2008/0112405 A1* | 5/2008 | Cholas et al. | 370/389 |
| 2008/0134156 A1 | 6/2008 | Osminer et al. | |
| 2008/0134165 A1 | 6/2008 | Anderson | |
| 2008/0134615 A1 | 6/2008 | Risi et al. | |
| 2008/0152316 A1* | 6/2008 | Sylvain | G11B 27/034 386/240 |
| 2008/0155059 A1* | 6/2008 | Hardin | H04N 7/17336 709/218 |
| 2008/0159714 A1* | 7/2008 | Harrar | H04N 5/782 386/291 |
| 2008/0184297 A1* | 7/2008 | Ellis | G11B 27/005 725/39 |
| 2008/0201748 A1 | 8/2008 | Hasek et al. | |
| 2008/0212947 A1* | 9/2008 | Nesvadba | G11B 27/28 386/291 |
| 2008/0235746 A1 | 9/2008 | Peters et al. | |
| 2008/0244682 A1* | 10/2008 | Sparrell | H04N 7/17318 725/134 |
| 2008/0273591 A1 | 11/2008 | Brooks et al. | |
| 2009/0010610 A1* | 1/2009 | Scholl et al. | 386/68 |
| 2009/0019485 A1* | 1/2009 | Ellis | H04N 5/44543 725/40 |
| 2009/0028182 A1 | 1/2009 | Brooks et al. | |
| 2009/0052863 A1* | 2/2009 | Parmar | G11B 27/034 386/323 |
| 2009/0052870 A1* | 2/2009 | Marsh | H04N 7/17318 386/292 |
| 2009/0077614 A1* | 3/2009 | White | H04N 7/165 725/139 |
| 2009/0100182 A1* | 4/2009 | Chaudhry | 709/229 |
| 2009/0165053 A1* | 6/2009 | Thyagarajan | H04N 5/44543 725/46 |
| 2009/0207866 A1 | 8/2009 | Cholas | |
| 2009/0210912 A1 | 8/2009 | Cholas | |
| 2009/0217332 A1* | 8/2009 | Hindle | H04N 5/782 725/109 |
| 2009/0220216 A1* | 9/2009 | Marsh | H04L 12/6418 386/292 |
| 2009/0254600 A1* | 10/2009 | Lee | H04N 21/4135 709/201 |
| 2009/0260042 A1* | 10/2009 | Chiang | H04L 12/2801 725/80 |
| 2009/0317065 A1* | 12/2009 | Fyock | H04N 5/76 386/200 |
| 2010/0061708 A1* | 3/2010 | Barton | H04N 5/765 386/241 |
| 2010/0223491 A1 | 9/2010 | Ladd et al. | |
| 2010/0247067 A1* | 9/2010 | Gratton | H04N 5/76 386/291 |
| 2012/0014255 A1* | 1/2012 | Svedberg | H04L 47/781 370/235 |
| 2012/0278841 A1 | 11/2012 | Hasek et al. | |
| 2013/0325870 A1 | 12/2013 | Rouse et al. | |

* cited by examiner

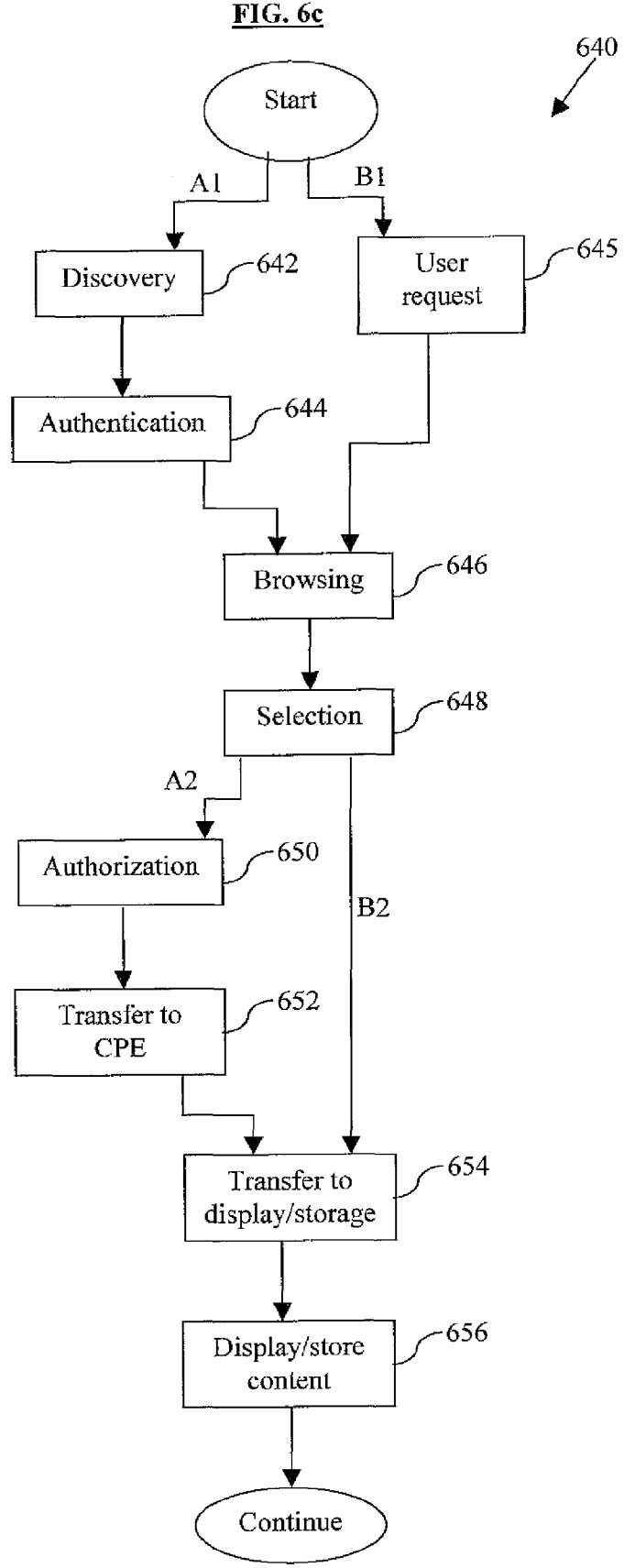

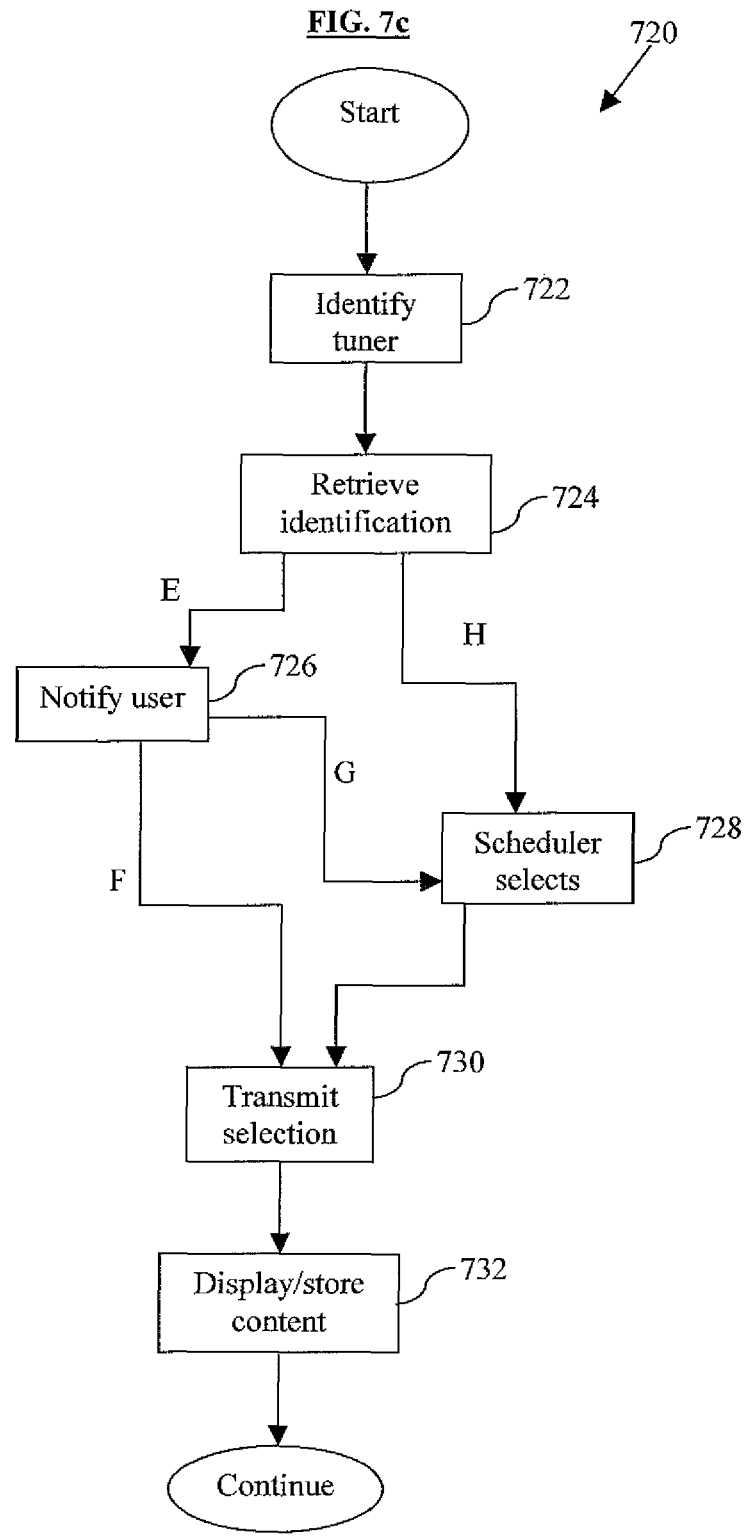

METHODS AND APPARATUS FOR PREMISES CONTENT DISTRIBUTION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content (e.g., multimedia, audiovisual, data, applications, etc.) delivery over a network. Specifically, in one aspect, the invention relates to the methods and apparatus for delivering content among a variety of devices of a network in communication with one another.

2. Description of Related Technology

Recent advances in digital information processing have made a wide range of services and functions available for delivery to consumers at their premises for very reasonable prices or subscription fees. These services and functions include digital programming (movies, etc.), digital video-on-demand (VOD), personal video recorder (PVR), Internet Protocol television (IPTV), digital media playback and recording, as well high-speed Internet access and IP-based telephony (e.g., VoIP). Other services available to network users include access to and recording of digital music (e.g., MP3 files), as well local area networking (including wireline and wireless local area networks) for distributing these services throughout the user's premises, and beyond.

Increased deployment of wireless interfaces such as Wi-Fi, Wi-MAX and Bluetooth have also increased the prevalence and opportunity for ad hoc networking; i.e. substantially spontaneous or flexible network topologies between as few as two different entities.

Currently, many of these services are provided and delivered to the user via a wide variety of different equipment environments including, inter alia, cable modems, Wi-Fi hubs, Ethernet hubs, gateways, switches and routers, computers, servers, cable set-top boxes, PSTNs, cellular telephones/smartphones, PDAs, and portable digital music devices such as the Apple iPod™. Additionally, the services associated with such technology are typically provided by multiple vendors including e.g., a cable service provider (e.g., MSO), cellular service provider (CSP), wireless service provider (WSP), VoIP service provider, music download service, Internet service provider (ISP), PSTN telephone service, etc.

Some improvements in digital service integration have been made over time. For example, cable system subscribers (such as those of the Assignee hereof) can now access VOD, PVR, PPV and broadcast services simultaneously, as well a Internet access via cable modem, and even digital telephony (e.g., VoIP). However, these functions are still substantially disparate in terms of their hardware and software environments (i.e., the user must have a cable modem, set-top box, VoIP telephony unit, PC, etc.), and "cross-over" between the environments (e.g., moving content or data from one environment to the other) is often quite limited.

Furthermore, various mechanisms for the secure movement of content delivered by these services within the user's premises (or even outside) have been employed, including, inter alia, conditional access, encryption, the establishment of trusted domains, and digital rights management. However, methods for managing and transferring data inside and outside of a user's premises to date have required the assistance of one or more separate entities; i.e., entities separate from the premises devices themselves.

Thus, improved apparatus and methods for facilitating the distribution of digital content within a user premises are needed. These would advantageously manage and transfer data without requiring entities separate from the serving and the requesting devices (e.g., premises devices) themselves. Such improved apparatus and methods would ideally operate substantially so as to allow ready implementation on any number of different platforms and environments in a substantially agnostic fashion, and provide users the ability to browse and transfer content between equipment with different vendor's security package implementations.

Such improved apparatus and methods would also preferably be implemented in a manner that is both substantially automated and transparent to the user, and which can leverage the capabilities of existing or planned industry-standard interface technologies such as Universal Plug and Play (UPnP) if desired.

SUMMARY OF THE INVENTION

The present invention addresses the foregoing needs by disclosing apparatus and methods useful for managing and distributing content within a premises (and beyond), including inter alia (i) storing content, (ii) detecting devices or entities in communication with a premises network, (iii) browsing content within such devices or entities; and (iv) transfer of content to and from authorized devices.

In a first aspect of the invention, a content server device is disclosed. In one embodiment, the content server device is used in a premises network, and comprises: a storage medium, the storage medium adapted to store content; and a digital processor comprising at least one computer program configured to receive and process requests for content. The computer program is adapted to: direct a search of the storage medium for the requested content; and direct a transfer of the requested content.

In one variant, the request for content comprises a request from a requesting customer premises equipment (CPE) and the direction a transfer of the requested content comprises directing a transfer of the content to the requesting CPE. In another variant, the request for content comprises a request from a user of the content server device.

In yet another variant, the content server device further comprises an authentication apparatus, the authentication apparatus adapted to facilitate authentication of the content-requesting entity and authorization of the requested content.

In still another variant, the content server device further comprises a receiving apparatus, the receiving apparatus adapted to receive content from one or more content servers on the network. The receiving apparatus may also comprise a display apparatus.

In a second aspect of the invention, a method of managing content is disclosed. In one embodiment, the method of managing content is used within a content server device, and comprises: directing browsing of the content by a user; processing a request for the content; and directing a transfer of the at least a portion of the content.

In one variant, the act of directing browsing comprises browsing of content presently available to the content server device which is stored on the content server device, stored on a headend entity to which the content server device has access, or received to the content server device via an RF tuner disposed on the content server device. In another variant, the direction of browsing comprises browsing a schedule of content which will be available at some future time to the content server device, and the direction of a transfer of at least a portion of the content comprising waiting until the future content becomes available.

In still another variant, the direction of a transfer comprises directing a transfer of the content to a storage apparatus or to a display apparatus.

In yet another variant, the method further comprises verifying that the requesting device comprises adequate security provisions for protecting the requested content before the transferring is commenced.

In a third aspect of the invention, a content requesting device is disclosed. In one embodiment, the content requesting device is configured for data communication with a content server device over a premises network, and the device comprises: a receiving apparatus, the receiving apparatus adapted to receive content from the server device; and a digital processor comprising at least one computer program. The computer program is adapted to: direct a request for content from the server device; direct a search of a storage medium associated with the server device for the requested content; and direct a transfer of the requested content.

In one variant, the content requesting device further comprises a storage medium adapted to store the requested content, and the direction of a transfer of the requested content comprises directing a transfer to the storage medium.

In another variant, the content requesting device further comprises a display apparatus adapted to display the requested content, and the act of direction of a transfer of the requested content comprises directing a transfer to the display apparatus.

In still another variant the content requesting device further comprises a scanning apparatus, the scanning apparatus being configured to locate one or more content server devices on the network.

In yet another variant, the content requesting device further comprises a software security architecture adapted to protect at least portions of the content after it is transferred to the rendering apparatus.

In still yet another variant, the stored content comprises a plurality of media files each having a respective substantially unique title.

In a fourth aspect of the invention, a method of transferring content is disclosed. In one embodiment, the method is used for transferring content between two devices associated with a network, and comprises: storing the content at a first of the two devices; directing browsing of stored content by a requesting device; receiving a request for transmission of at least a portion of the content; and directing a transfer of the at least portion of the content to the requesting device while maintaining the content protection.

In one variant, the method further comprises authenticating the requesting device, the authentication being accomplished by the computer program running on at least one of the two devices.

In another variant, the stored content comprises a plurality of media files each having a respective substantially unique title, and the browsing comprises searching the titles.

In yet another variant, the requesting device comprises adequate security provisions for protecting the requested content before the transferring is commenced. For example, the first and second devices may comprise an authorized service domain (ASD) for maintaining protection of the content.

In still yet another variant, the first and second devices are in data communication with one another via a substantially standardized communications interface (e.g., a Universal Plug and Play (UPnP) interface), and the first device completes the authentication using a substantially standardized security architecture.

In a fifth aspect of the invention, a method of sharing content is disclosed. In one embodiment, the method is used for sharing protected content within an ad hoc network, and comprises: establishing ad hoc a communication channel between first and second entities, at least the first and second entities forming the network when the channel is established; selectively allowing at least one of the entities to browse content of the other of the entity, the browsing directed at least in part by a computer program adapted to run on at least one of the entities; receiving at one of the entities a request for at least portion of the content from the other the entity; and selectively transferring at least a portion of the content from at least one of the entities to the other of the entities, the transferring being directed at least in part by the computer program adapted to run on at least one of the entities.

In one variant, the browsed content comprises content stored on the browsed entity.

In another variant, the browsing comprises viewing a schedule of the future content, and wherein the browsed content comprises content which will be available to the browsed entity at some time in the future.

In yet another variant, the method further comprises the browsed entity notifying the other entity when the content available to the browsed entity at some time in the future becomes available.

In another variant, the act of transferring at least a portion of the content comprises transferring at least a portion of the content to a storage medium or a display apparatus.

In still another variant, the method further comprises authenticating at least one of: (i) the first entity to the second entity, or (ii) the second entity to the first entity. Authentication is accomplished by the computer program adapted to run on at least one of the entities, and the transfer of at least a portion of the content may be based, at least in part, on the authentication.

In yet another variant, the act of establishing comprises causing the first and second entities to be placed in data communication via at least a plug-and-play data interface.

In still yet another variant, the act of establishing comprises causing the first and second entities to be placed in data communication via a wireless interface wherein one of the first and second entities assumes a first role and the second entity assumes a second role with respect to the communication channel. The first role may comprise a master station, and the second role a slave station. For example, the first role may comprise an access point (AP), and the second role may comprise a station (STA), the AP providing data connectivity to at least one other entity other than the STA.

In a sixth aspect of the invention, a computer readable apparatus is disclosed. In one embodiment, the computer readable apparatus comprises media adapted to contain a computer program having a plurality of instructions, the plurality of instructions which, when executed: process requests for content; direct browsing of available content; and direct a transfer of the requested content.

In one variant, the computer program is run on a first device, the requests for content comprise requests from the first device, or a second device, and the available content comprises content stored on the first device.

In another variant, the computer program is further adapted to receive content over a network interface, and wherein the available content comprises content received from the interface. The network interface may comprise at least one RF tuner. The computer program may be run on a first device, and the requests for content may comprise requests from the first device, or a second device, for content received from the interface. The available content may comprise content available at some future time, the computer program further adapted to maintain the requests for the content available at some future time and implement the requests at some time after the future time when the content becomes available.

In yet another variant, the computer program is run on a first device, the requests for content comprise requests from the first device, and a transfer of the requested content to a storage apparatus or a display apparatus associated with the first device is performed.

In still another variant, the computer program is run on a first device, the requests for content comprise requests from a second device. A transfer is directed to a storage apparatus or a display apparatus associated with the second device.

These and other aspects of the invention shall become apparent when considered in light of the disclosure provided herein.

BRIEF DESCRIPTION OF THE DRAWINGS

FIG. 6c is a logical flow diagram of another exemplary method of content transfer utilizing a content handler, according to the present invention, which is adapted to enable a user to view and/or record content which is presently broadcast.

FIG. 7c is a logical flow diagram illustrating an exemplary method of resolving contention issues utilizing a content handler, according to the present invention.

DETAILED DESCRIPTION OF THE INVENTION

Figure 1:
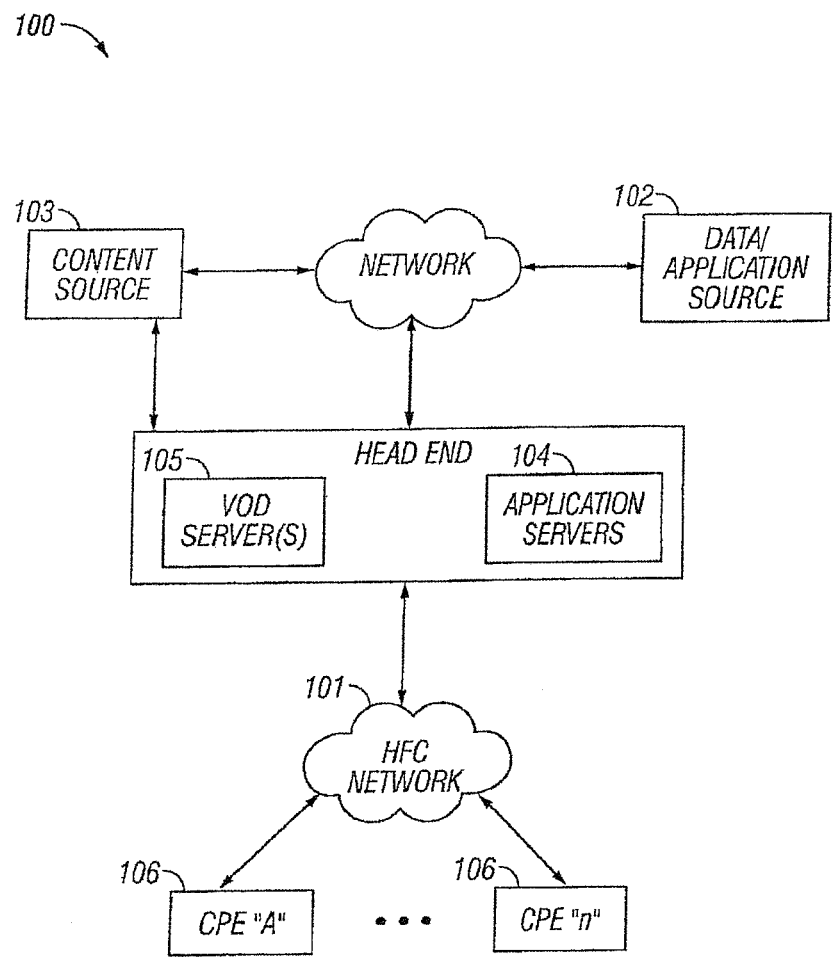
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally and without limitation to a terminal device that has access to digital television content via a satellite, cable, or terrestrial network. The host device functionality may be integrated into a digital television (DTV) set. The term "customer premises equipment" (CPE) includes without limitation electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateways or gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), or IrDA families.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the terms "render" and "renderer" refer to any device, process or entity which utilizes content for, without limitation, display, execution, or playback. For example, a renderer might comprise a DVR, television monitor, PC, mobile device with display capability, laptop computer, iPod or even an MP3 player.

As used herein, the terms "security framework" and "security package" refer generally to, without limitation, one of more of implementation guidelines, security policies, application programming interfaces (APIs), encryption or scrambling algorithms, and cryptographic element (e.g., symmetric or asymmetric key) generation and management algorithms.

As used herein, the term "server" refers to any computerized component, system or entity regardless of form which is adapted to provide data, files, applications, content, or other services to one or more other devices or entities on a computer network.

As used herein, the terms "PnP" and "Plug and Play" refer generally to a capability wherein devices can communicate when first placed in communication according to a substantially known or standardized capability. Such communication is generally without requiring reconfiguration or manual installation of device drivers. One exemplary embodiment of such PnP capability is the Universal PnP (UPnP) technology set forth in "UPnP™ Device Architecture" Version 1.0, dated Jun. 8, 2000, incorporated herein by reference in its entirety.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/i/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, Wi-MAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides a apparatus and methods for the management of content within a single device and for several devices connected to a home network to transfer protected content (including for example audiovisual or multimedia content, applications or data) in a substantially "peer-to-peer" fashion and without resort to a central security server or other such entity. The management, transfer, and "browsing" of content on a single device or on a plurality of devices is accomplished via a content handler which, in one embodiment, is an application run on at least one of the devices and adapted to sit between the OCAP digital navigator and OCAP stack. The content handler utilizes various algorithms in conjunction with several "buckets" to make management, transfer, and browsing possible.

In one exemplary embodiment, the content handler is disposed on a server device and directs the browsing of stored and other available content as well as the transfer of selected content within the device itself and to other devices. It is noted that the server device may comprise a CPE, host device, or other entity, including, inter alia, a VOD server or PVR entity. The content handler of the present embodiment may also include authentication functionality to ensure transfer between authorized devices. Further, the content handler may also comprise a scheduler adapted to maintain a schedule of upcoming content (i.e. content that will be available at a future time), and manage tuner resources including scheduling the resources for receipt of future content.

In another exemplary embodiment, the content handler is disposed on a requesting device; the content handler of this embodiment is adapted to direct requests to server devices (including, e.g. CPE, VOD servers, PVR entities), directs searches of the server devices, and direct transfers from server devices to the various components of the CPE on which the content handler is present.

Methods for transfer of content within a device utilizing a content handler as well as methods for the transfer of content between two devices, where at least one device utilizes a content handler are also described.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multimedia specific operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Further, it is noted that, while the present discussion is given in terms of traditional CPE (i.e., devices which receive content from traditional RF tuner interfaces), other devices may be utilized in conjunction with the present invention as well. For example, in one embodiment, one or more of the server and/or renderer devices may comprise an IP video device (IVD); an IVD is a device which receives video stream from an IP connection (rather than RF connection). Exemplary IVD may include, inter alia, IP STB's, cellular telephones, laptops, general purpose PC's, gaming consoles, etc.

Further, it is appreciated that while described generally in the context of the OpenCable Application Platform (OCAP) operating system, other systems including, inter alia, MHP, ARIB, ACAP or proprietary may be utilized consistent with the present invention.

Lastly, it is recognized that while described primarily in the context of a consumer or enterprise premises having a prescribed geographic scope or boundaries, the invention is in no way limited to any such premises description. For example, a "premises" as used herein could refer to a psychologically proximate premises; e.g., a group of entities or locations that are not physically proximate, but rather logically proximate with respect to a user, such as that user's home, office, and car. Similarly, a "premises" could refer to psychologically proximate devices irrespective of their physical location (e.g., "my cellular phone", "my DVR", etc.), or even psychologically proximate users ("my girlfriend", "my mother", "my boss", etc.) again irrespective of their location.

Content Delivery Network—

FIG. 1 illustrates a typical content-based network configuration with which the premises content distribution apparatus and methods of the present invention may be used. As will be described in greater detail subsequently herein, the premises content distribution apparatus and methods of the invention are advantageously both independent of and agnostic to the delivery mode for the content; hence, the following discussion regarding cable network architectures is purely illustrative of one of many possible delivery modalities for content. Moreover, the present invention is independent of the delivery paradigm used within the network to deliver the content (i.e., broadcast, session-based, etc.).

The various components of the exemplary content delivery network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for clarity, although it will be recognized that comparable architectures with multiple origination points, distribution servers, VOD servers, and/or CPE devices (as well as different network topologies) may be utilized consistent with the invention. For example, the headend architecture of FIG. 1*a* (described in greater detail below) may be used.

The data/application origination point 102 comprises any medium that allows data and/or applications (such as a VOD-based or "Watch TV" application, or other application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104 or other network agent or entity. Exemplary embodiments of the CPE of the invention are described subsequently herein with respect to FIGS. 3, 5, 7*a* and 7*b*. It may also include a network server, as described subsequently herein.

Figure 1A:
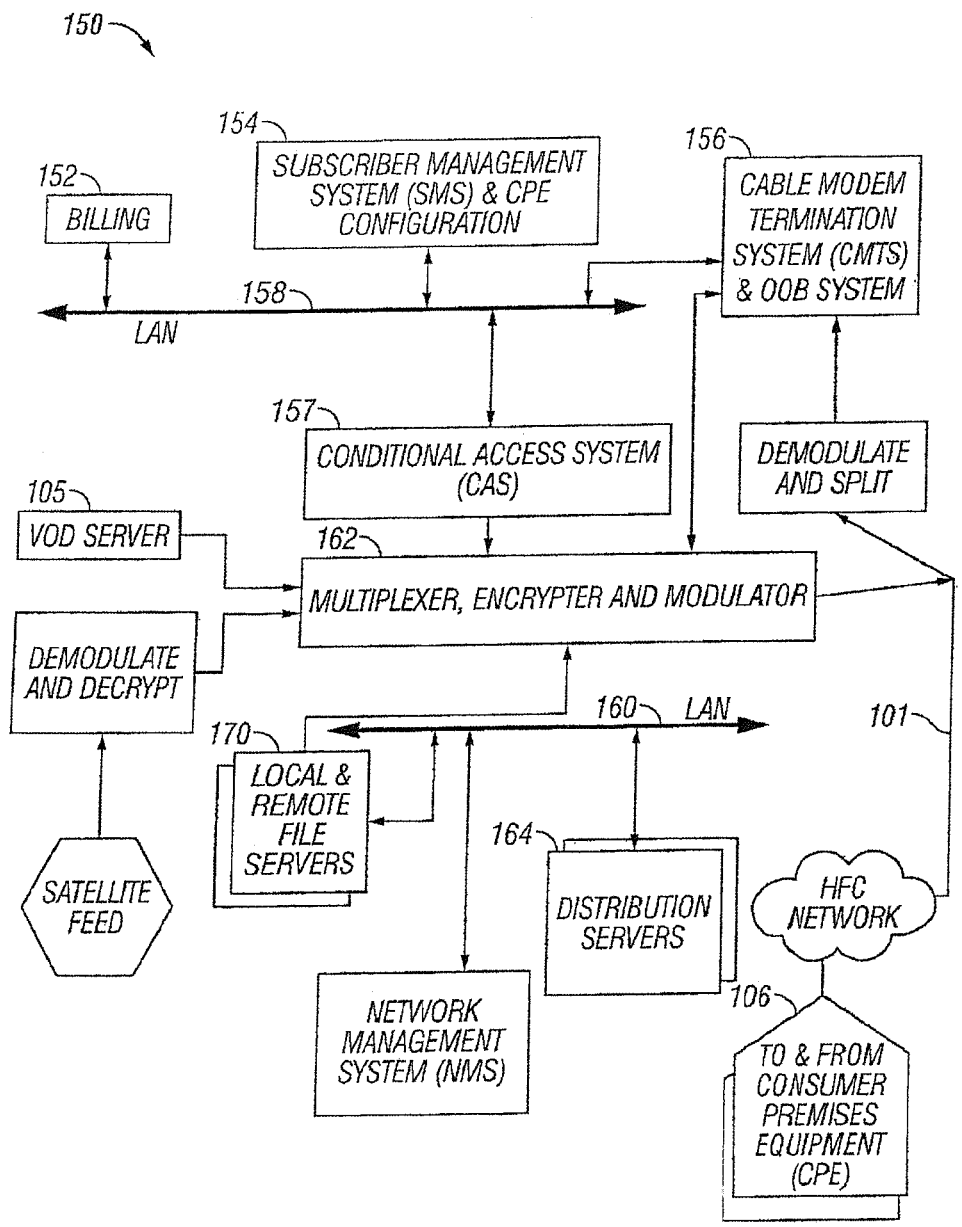
FIG. 1a is a functional block diagram illustrating one exemplary HFC cable network headend configuration useful with the present invention.

Referring now to FIG. 1*a*, one exemplary embodiment of network headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It is also noted that the headend configuration depicted in FIG. 1*a* is high-level, conceptual architecture and that each MSO may have multiple headends deployed using custom architectures.

The architecture 150 of FIG. 1*a* further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1*b*) via a variety of interposed network components.

A digital rights management (DRM) server, not shown, may also reside at the headend 150, and used for serving DRM requests from downstream devices such as the CPE 106. The exemplary DRM server comprises a computer system where the security and encryption aspects of content transferred over the network 101 are managed. The content servers described above may implement encryption and CA technology in conjunction with the DRM server such that the content made available over the network can be received and decoded by specific CPE 106 only.

Content (e.g., audio, video, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specifications provide for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
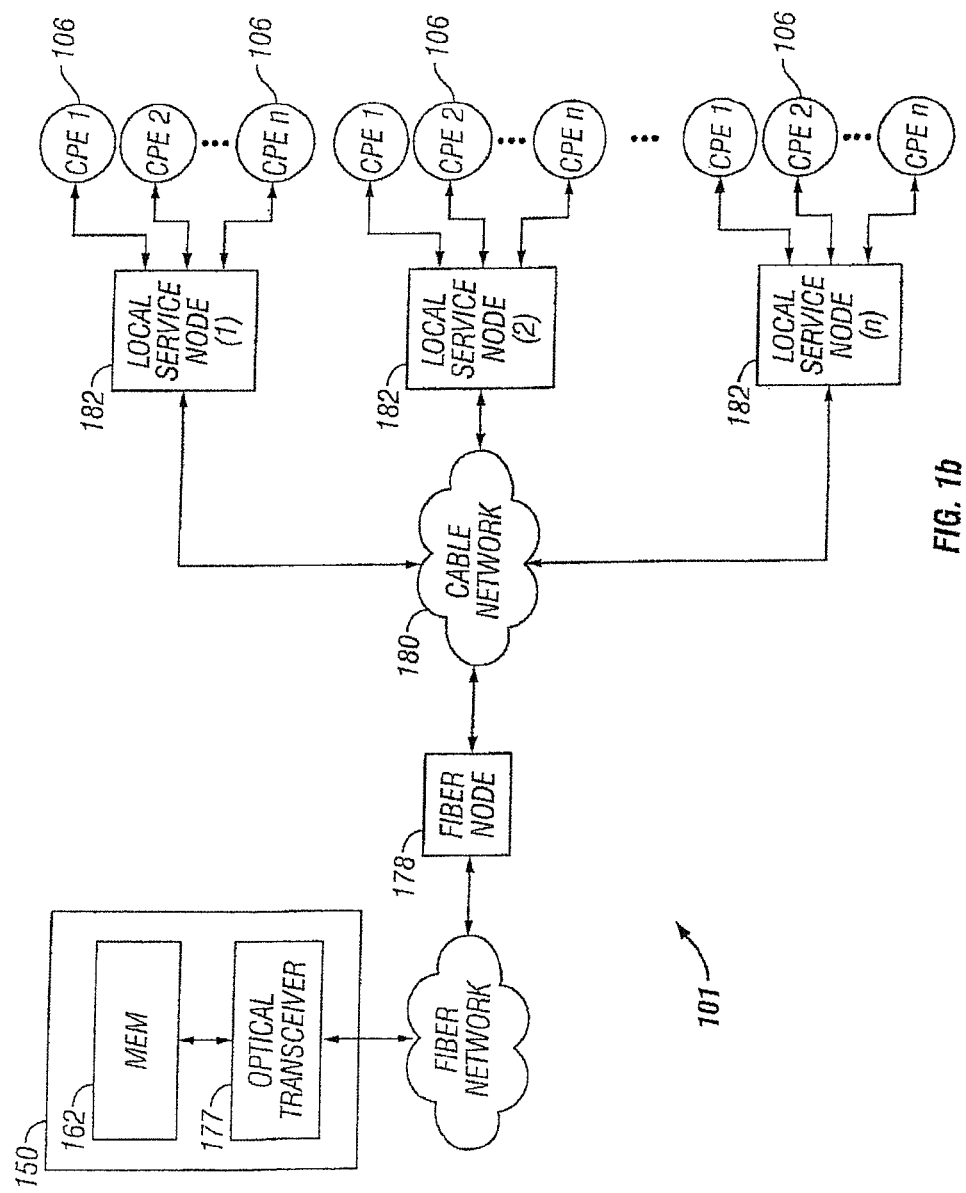
FIG. 1b is a functional block diagram illustrating one exemplary local service node configuration useful with the present invention.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

FIG. 1*e* illustrates exemplary "switched" network architecture also useful with the premises content distribution architecture and methods of the present invention. While a so-called "broadcast switched architecture" or BSA network is illustrated in this exemplary embodiment, the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1 shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique for effectively providing program material in a cable television system", incorporated herein by reference in its entirety, describes one exemplary broadcast switched digital architecture useful with the present invention, although it will be recognized by those of ordinary skill that other approaches and architectures may be substituted.

Figure 1C:
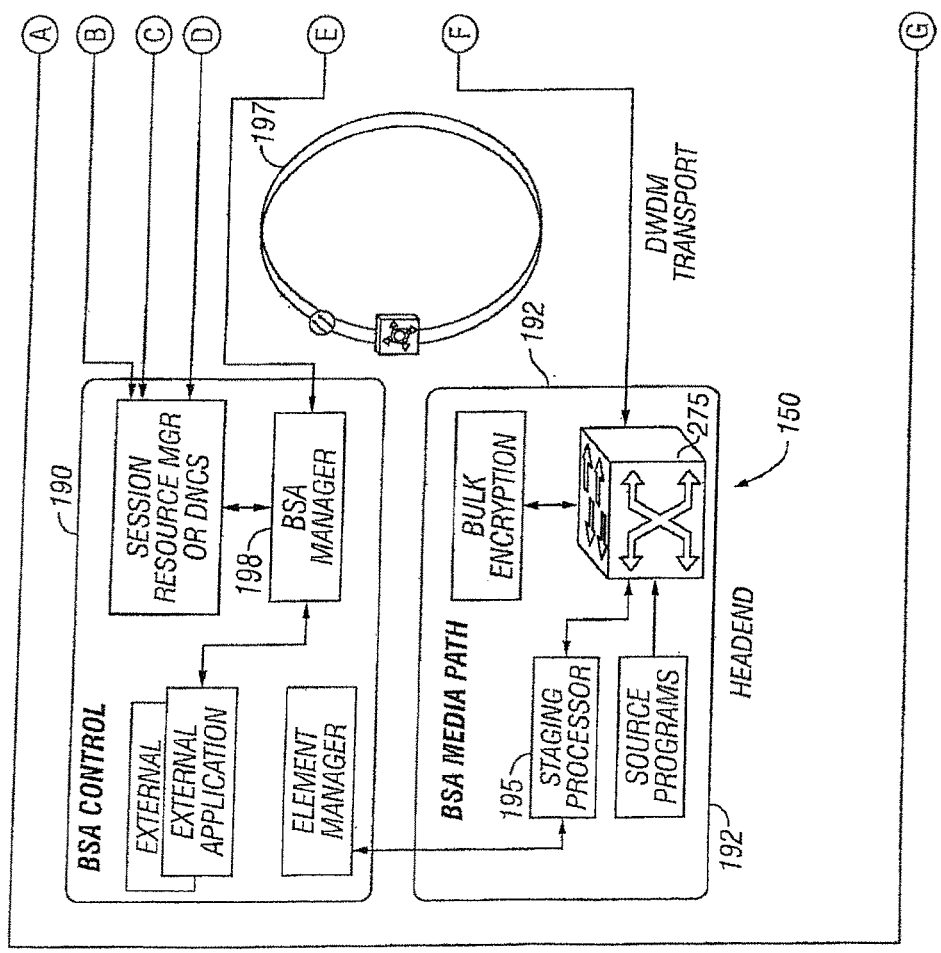
FIG. 1c is a functional block diagram illustrating one exemplary broadcast switched architecture (BSA) network useful with the present invention.
Figure 1C:
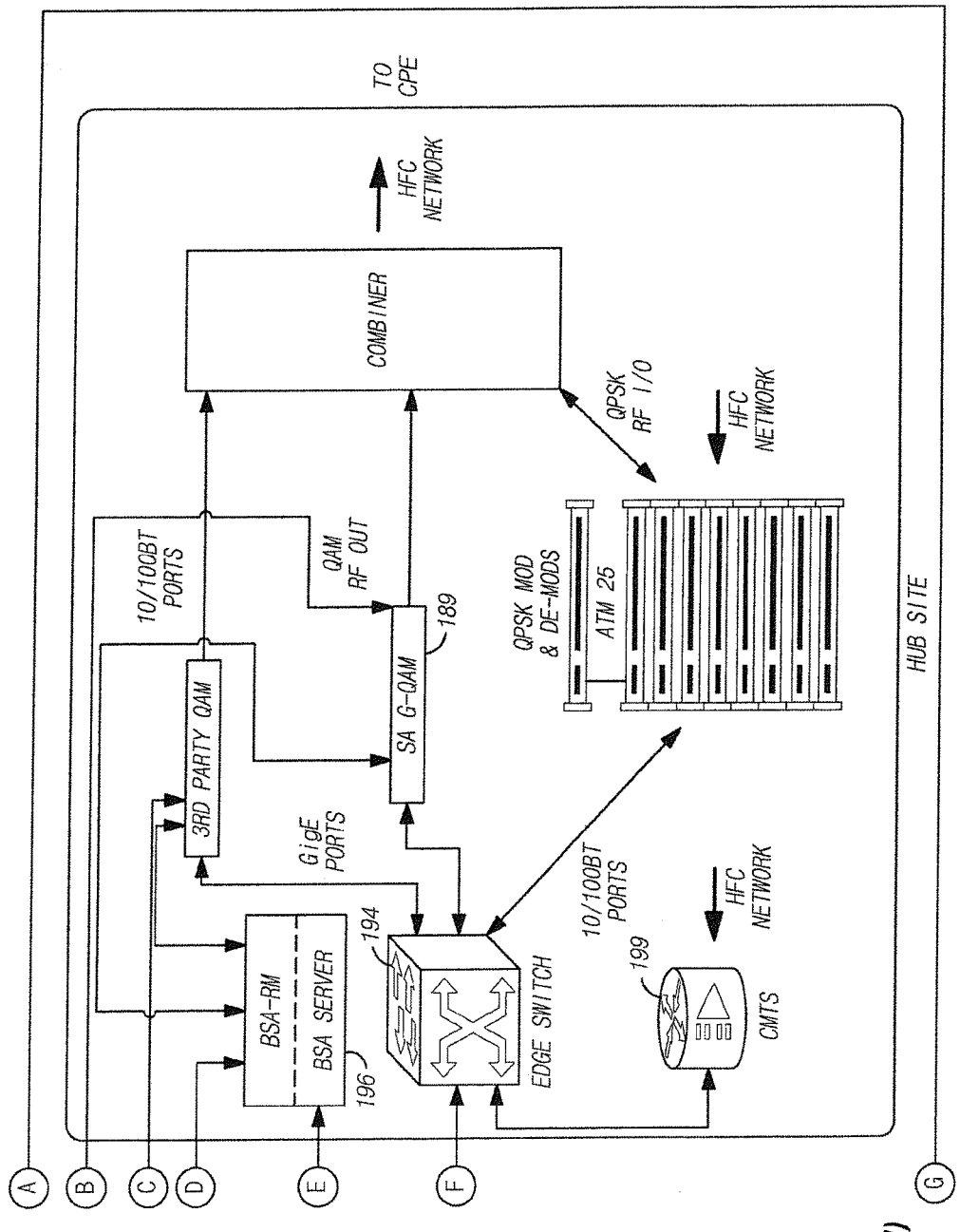

In addition to "broadcast" content (e.g., video programming), the systems of FIGS. 1*a*-1*c* also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device (e.g., converged device, as discussed subsequently herein) for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Co-pending and co-owned U.S. patent application Ser. No. 11/013,665 filed Dec. 15, 2004 and entitled "Method and apparatus for high bandwidth data transmission in content-based networks", incorporated herein by reference in its entirety, describes yet another delivery model for the aforementioned content, based on a high-speed VOD-based infrastructure.

It will be appreciated that the content delivery network used with the premises distribution functions of the present invention may also include a downloadable conditional access (CA), DRM, or trusted domain (TD) apparatus such as those described in co-pending and co-owned U.S. patent application Ser. No. 11/584,208 filed Oct. 20, 2006 and entitled "Downloadable security and protection methods and apparatus", incorporated herein by reference in its entirety. Such download apparatus is useful at, inter alia, the headend or distribution hub of a cable network, for implementing a download paradigm for legacy or newly developed CA, TD, and DRM software and cryptographic protection schemes. This allows the network operator, and even the third party content provider by proxy, to exert additional control on viewing, reproduction, and migration of content distributed over the network. In one embodiment, these capabilities comprise downloadable personalized software modules (images), and an associated decryption key that facilitates decryption of the downloaded software images. In contrast to prior art approaches of merely encrypting the content itself (such as via a DES or AES algorithm via a symmetric or asymmetric key approach), the exemplary embodiments referenced above allow for the download of secure software images, which may be used to, inter alia, ensure security of the downloaded images and also migrate protected content to other platforms in the user or client domain so as to extend the trusted or authorized service domain. Advantageously, outside of the conditional access system (CAS), the personalized software image is never rendered in an unprotected form or otherwise made accessible.

Premises Content Distribution System—

Figure 2:
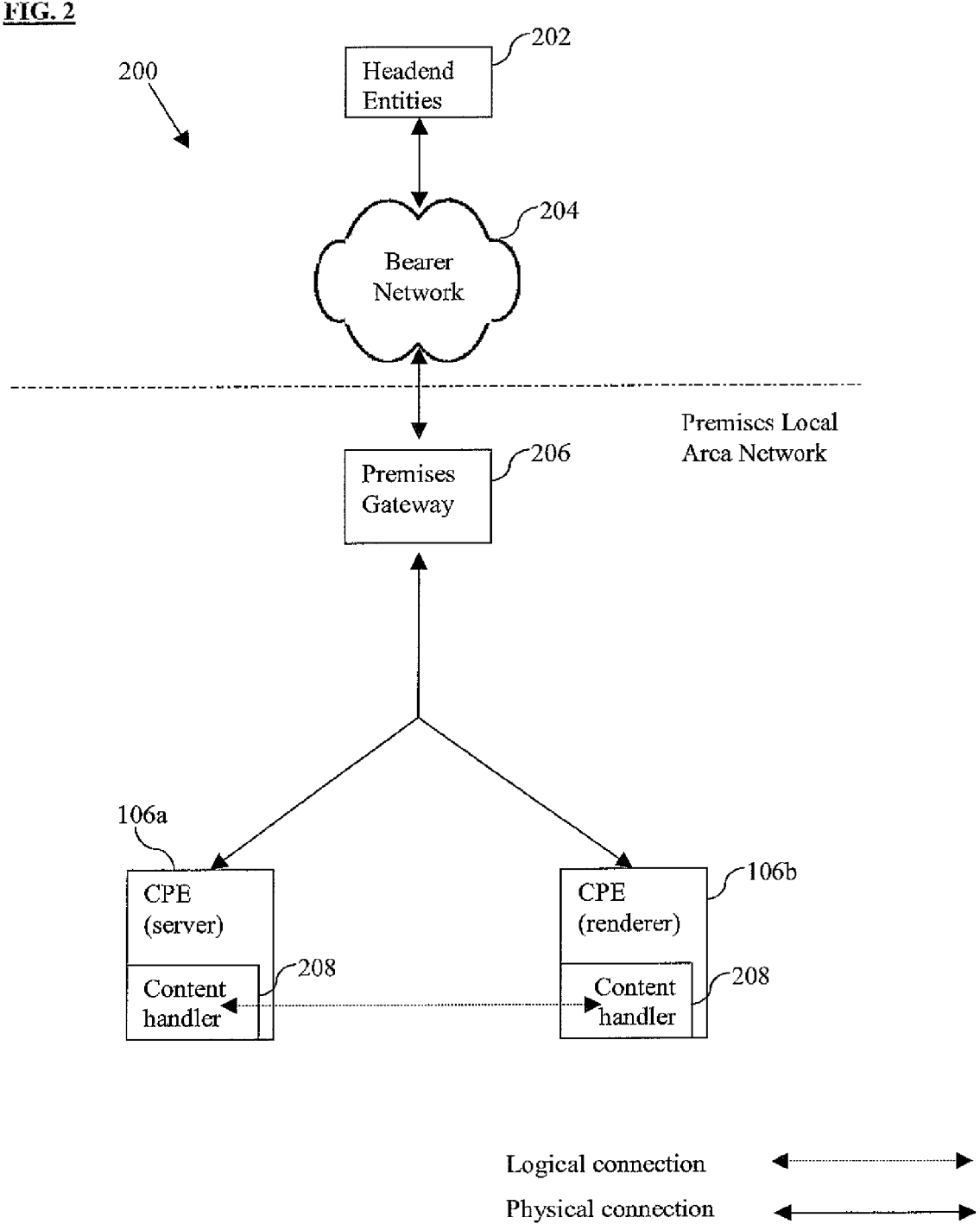
FIG. 2 is a graphical representation of generalized network architecture implementing various devices having improved content distribution according to the present invention.

Referring now to FIG. 2, an exemplary embodiment of a premise content distribution system 200 according to the invention is described in detail. A simple architecture comprising one of each of the aforementioned components is shown in FIG. 2 for clarity, although it will be recognized that comparable architectures with multiple components, as well as different network topologies, may be utilized consistent with the present invention.

As shown in FIG. 2, the exemplary content distribution system 200 comprises a plurality of components in communication with one another. The various components directly or indirectly communicating may include (i) one or more Premises Gateways 206, (ii) one or more "server" consumer premises equipment (CPE) 106*a* functioning as a content source or server, and (iii) one or more "renderer" CPE 106*b* functioning as a renderer of content. It will be appreciated that a single device or entity may also switch roles (i.e., from server to renderer, or vice-versa), and may carry out both functions (i.e., server and renderer), albeit not necessarily for the same process or thread. Moreover, role switching can occur as part of the underlying transport or PHY functions (e.g., a Wi-Fi AP/STA role switch, or Bluetooth Master/Slave role switch) while the server-renderer functions described herein are preserved.

The premises gateway 206 includes a hardware platform that is generally installed either inside or outside of the premises. The premises gateway 206 platform is connected to the bearer network 204 (e.g., HFC 101, satellite network, Telco DSL network, etc.) via an appropriate interface such as a coaxial cable or DOCSIS connection, a digital subscriber line (DSL) telephony connection, an Internet Protocol Television (IPTV) connection over copper wire, a satellite receiver coupled to an antenna, etc. The premises gateway 206 is also connected on its back end to other equipment that is installed in the premises (not shown). In one embodiment, the premises gateway 206 is connected to the other premises equipment via a premises local area network, or PLAN, interface such as that described in co-owned, co-pending U.S. patent application Ser. No. 11/592,054 entitled "Methods and apparatus for premises content distribution"; which is hereby incorporated by reference in its entirety.

The connection of the premises gateway to the other premises equipment may take literally any form, whether wired or wireless, including, inter alia a 10/100/1000/10-Gig-E NIC, a Wi-Fi interface card, or a coaxial RF interface, or any other mechanism known in the art.

In some implementations, the premises gateway 206 might be connected to more than one bearer network, and/or may have multiple various connections to various PLAN (not shown) or CPE 106. For example, a premises gateway 206 may be connected to some devices over a wireless connection and other devices over a wired connection such as a telephone line, power line, or indigenous coaxial cable The present invention accordingly contemplates various implementations of the premises gateway functionality. For example, one exemplary converged device useful with the present invention is described in co-owned and co-pending U.S. patent application Ser. No. 11/378,129 filed Mar. 16, 2006 and entitled "Methods and apparatus for centralized content and data delivery", incorporated herein by reference in its entirety, although it will be recognized by those of ordinary skill that other devices and approaches may be substituted.

In the illustrated embodiment, the present invention utilizes at least two CPE 106a, 106b in communication with one another. One of the CPE 106a functions as a content server, while the other CPE 106b functions as a content renderer. The server CPE 106a therefore functions to store content. The content can be stored using one or more storage media such as a hard drive (HDD), flash memory card or USB key, optical disc, memory array, RAID, etc. The storage may be present "in the box", or may comprise an attached external device 210 attached to the server CPE 106a via a dedicated or shared connection. It is appreciated that in one embodiment the content server CPE 106a and the premises gateway 206 may be implemented on the same physical platform. In such as case, the content server/premises gateway might take the form of, e.g., a DVR or a multi-room DVR device that interfaces to one or more distribution networks 101. It may also comprise one or more high-speed interfaces (e.g., USB 2.0, IEEE-Std. 1394 "Firewire", etc.) over which plug-and-play functionality may be implemented. Further, as noted above, the functions of the content server CPE 106a may also be implemented by the renderer CPE 106b. It is also appreciated that in other embodiments, the content server CPE 106a may comprise a headend entity such as a VOD server 105, or network PVR; or BSA hub entity.

Both CPE 106a, 106b of the illustrated embodiment comprise a hardware/software platform including a content handler 208, which will be discussed in greater detail below. However, it is appreciated that in alternative embodiments, only one CPE 106 comprises a content handler 208. Generally, the content handler 208 permits the content server CPE 106a and the content renderer CPE 106b to be in communication with one another to send and receive content between them. The content handler 208 is also adapted to communicate with the resource manager (not shown), content manager (not shown), and other components of the CPE 106, as well as other components of other CPE 106 which do not have content handlers 208 of their own. According to this embodiment, the CPE 106 having a content handler 208 would still be adapted to send and receive content to and from a legacy device (a CPE 106 which does not have a content handler 208) as well as other network components.

Similarly, the content server CPE 106a may merely act as a proxy for an upstream device connected to multiple distribution networks. One such device is disclosed in a co-owned and co-pending U.S. patent application Ser. No. 11/440,490 filed May 24, 2006 and entitled "Personal content server apparatus and methods", incorporated herein by reference in its entirety. In one embodiment, the device comprises a personal content server located, e.g., at the headend of the bearer (cable) network or at a BSA switching hub; this server distributes content to the remote requesting location(s), thereby eliminating repetitious traffic to and from subscriber's premises to fulfill the requests for remote content delivery.

It will be appreciated that the present invention can also be used in a complementary or layered fashion with other content acquisition, management and control technologies. For example, the methods and apparatus described in co-pending and co-owned U.S. patent application Ser. No. 11/080,693 filed Mar. 14, 2005 entitled "Method and apparatus for network content downloading and recording", incorporated herein by reference in its entirety, may be used consistent with the present invention to provide network users with the ability to purchase and record content to a physical medium, while also obeying the security policies imposed by the relevant security architecture (e.g., TD or ASD).

CPE Architecture—

Figure 3:
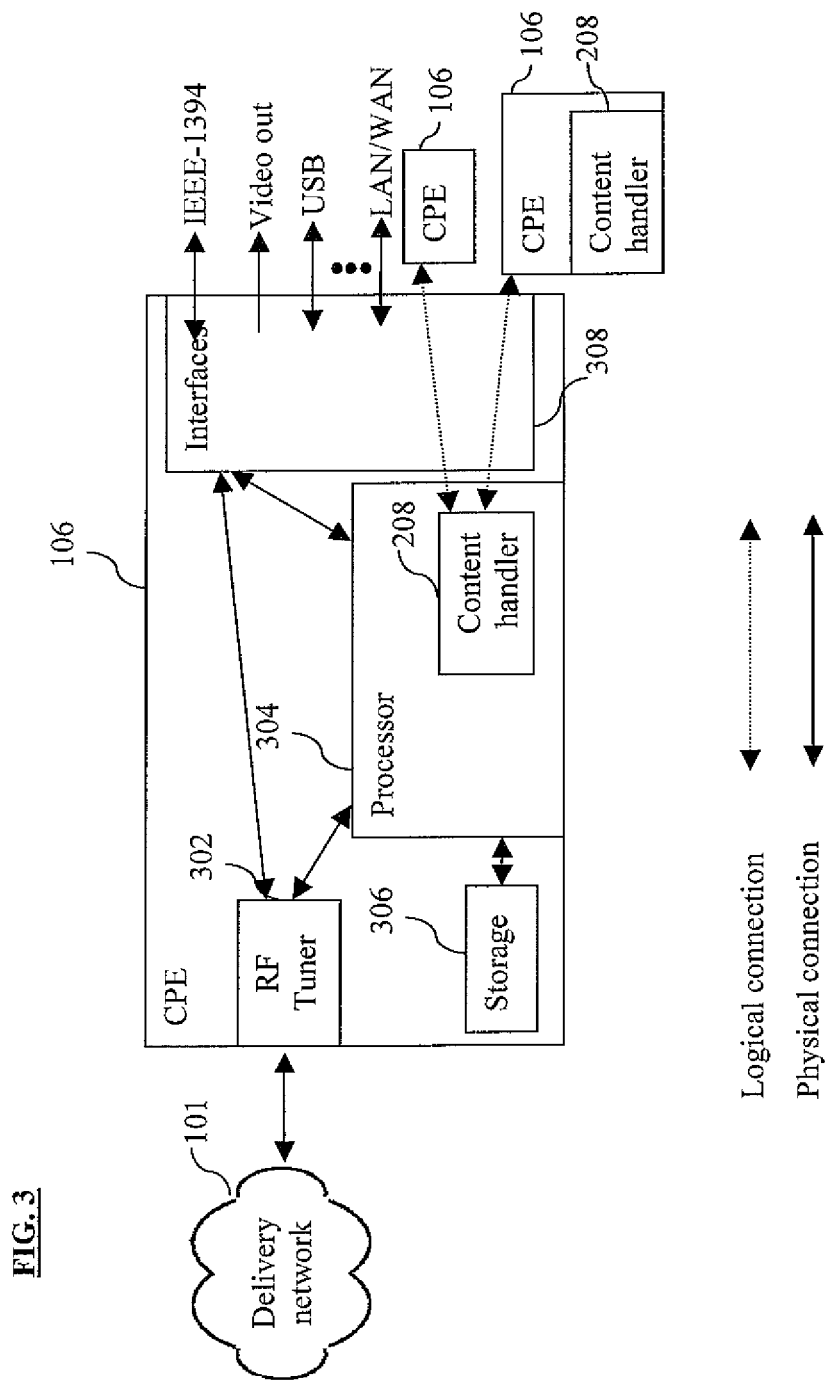
FIG. 3 is a functional block diagram of an exemplary embodiment of a consumer premises or client device implementing the content handler of the present invention.

Referring now to FIG. 3, one exemplary embodiment of a server or renderer CPE 106a, 106b according to the present invention is described. As previously noted, server CPE 106a or render CPE 106b can be identical, and even perform both functions (i.e., serving content and rendering content at different times, or at the same time for different processes/threads); thus will be collectively and generally referred to as CPE 106.

As shown in the simplified diagram of FIG. 3, the device 106 generally comprises a computerized system (e.g., embedded DSTB, converged premises device, etc.) having an RF tuner 302 for interface with the delivery network 101 (or any interposed gateway devices) of FIG. 2, digital processor(s) 304, storage device 306, and a plurality of interfaces 308 (e.g., video/audio interfaces, IEEE-1394 "Firewire", USB, serial/parallel ports, etc.) for interface with other end-user apparatus such as televisions, personal electronics, computers, Wi-Fi or other network hubs/routers, etc. It is appreciated that although only one tuner 302 is depicted, other embodiments of the present invention may comprise more than one tuner 302 or a wideband or ultra-wideband tuner consistent with the present invention.

Other components which may be utilized within the device (deleted from FIG. 3a for simplicity) include various processing layers (e.g., DOCSIS MAC or DAVIC OOB channel, MPEG, etc.) as well as media processors and other specialized SoC or ASIC devices. A separate cable modem (e.g., DOCSIS) tuner may also be included for receiving downstream cable modem signals over the coaxial cable. The CPE 106a may also comprise an integrated HD decoder, thereby relieving any connected monitors or other devices from the requirement of having such a decoder. These additional components and functionality are well known to those of ordinary skill in the cable and embedded system fields, and accordingly not described further herein.

Alternatively, the CPE 106 may comprise a "head-less" configuration, wherein the only user interaction with the device occurs over a network connection; e.g., in a PVR-like fashion.

The CPE 106 of FIG. 3 is also adapted include a content handler 208. The content handler 208 is an OCAP-compliant Java-based middleware application which, inter alia, manages the operation of the device 106 and other applications running thereon. The software architecture of the content handler 208 is discussed in farther detail below.

It will be recognized by those of ordinary skill that myriad different device and software architectures may be used consistent with the tuning and channel request functions of the present invention, the device of FIG. 3 being merely exemplary. For example, different middleware (e.g., MHP, ARIB, ACAP or proprietary) may be used in place of the OCAP middleware of the illustrated embodiment.

Likewise, the content handler 208 of the CPE 106 may contain application layer programs which allow interactivity with other devices 106 on the network. Because the content handler 208 is OCAP compliant, the content handler 208 of the present invention may be adapted to communicate and interact with the content handler 208 of another CPE 106, or with the resource manager (not shown) or other entity present on another CPE 106 via the other entity's OCAP system. It is appreciated that a variety of protocols may be utilized to effectuate such communication. In one embodiment, the communication protocol is Internet Protocol based. Examples of such programs include UPnP application, a program guide, and so on. The content handler 208 may be implemented such that a user can control a renderer CPE 106b "directly" or "over the network." The direct control to a user may be in the form of a remote control, control switches and buttons (e.g., volume control knob). When the renderer CPE 106b is controlled "over the network", a user may be able to configure the device by accessing its controls via a network connection and content handler 208 present in one or both CPE 106. In one embodiment, one network may be used for accessing and controlling the device 106b; in another embodiment, a separate network may be used for accessing and controlling respectively. However, in a preferred embodiment, the same network is used to achieve both tasks, such as for example the PLAN network of previously incorporated U.S. application Ser. No. 11/592,054.

The exemplary content handler 208 of the present invention may also farther comprise a personal media application, which allows a user to manage his personal media tasks. Such management includes, but is not limited to, the ability to browse through programs stored locally or on a server to see which programs are available for viewing. Previewing and similar extended "browsing" functionality may also be provided. In the virtual PVR or network PVR scenarios described elsewhere herein, such programming or content may be stored on a server located at the headend, with the CPE 106 acting effectively as its proxy. The personal media application may also be made responsive to a network-side application that queries the CPE to check on the program titles stored on the CPE 106.

As previously noted, either of the CPE 106a, 106b of the invention may be embodied as a multi-function or converged premises device, such as that described in co-owned and co-pending U.S. patent application Ser. No. 11/378,129 filed Mar. 16, 2006 previously incorporated herein. This exemplary configuration (not shown) comprises a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises via a content handler 208 running thereon, and providing both a wired and wireless network in the home. Telephony services utilizing e.g., embedded multimedia terminal adapter (eMTA) and/or Wi-Fi architectures may also be provided via the device; these services can make use of the network operator's indigenous VoIP or comparable telephony capability if desired, thereby providing an even more unified service environment and a mechanism for the various devices 106 to communicate and interact with one another via at least one content handler 208.

In another embodiment, a wired home network utilizing existing coaxial cable in the premises is created, by using e.g., an Ethernet-to-coaxial bridge technology based on the MoCA specification. According to this embodiment, existing devices and DVRs (i.e. those not having content handlers 208) are permitted to connect and share content with a CPE 106 via a connection to its content handler 208.

In yet another embodiment, the CPE 106 is advantageously accessible via any remote device with internetworking (e.g., Internet) capability. The content handler 208 of the CPE 106 would be adapted accordingly and would thereby allow personal content to be accessed by the user from outside the premises.

Content Handler Architecture—

Figure 4A:
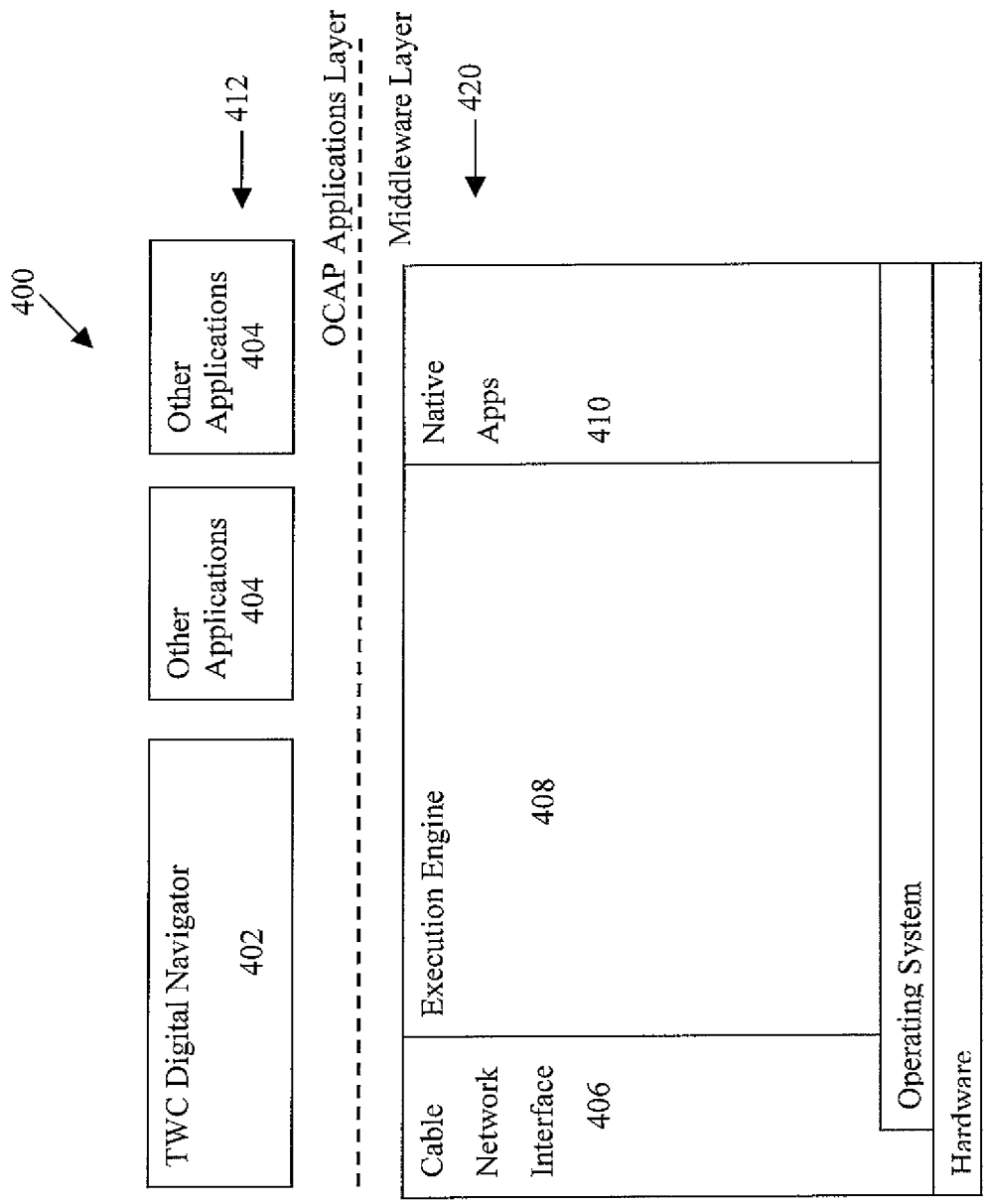
FIG. 4a is a functional block diagram of an exemplary prior art OCAP stack.

FIG. 4a is a generalized representation of the OCAP stack 400 as traditionally employed in prior art CPE 106. As illustrated, the OCAP stack 400 generally comprises an applications layer 412 and a middleware layer 420. The applications layer 412 is where various applications, bestowing various functions, are placed. The illustrated embodiment shows an applications layer 412 having a TWC OCAP Digital navigator (ODN) application 402, such as that described in co-owned, co-pending U.S. patent application Ser. No. 11/607,663 entitled "Methods and apparatus for software provisioning of a network device" which is incorporated herein by reference in its entirety; however it is appreciated that other navigators may be utilized consistent with the present invention. The applications layer also comprises a plurality of other applications 404 which may be run including, for example, a TWC Monitor, a Watch TV application, etc. The middleware layer 420 generally comprises native applications 410, a cable network interface 406, and a plurality of modules (not shown) run on an execution engine 408.

Figure 4B:
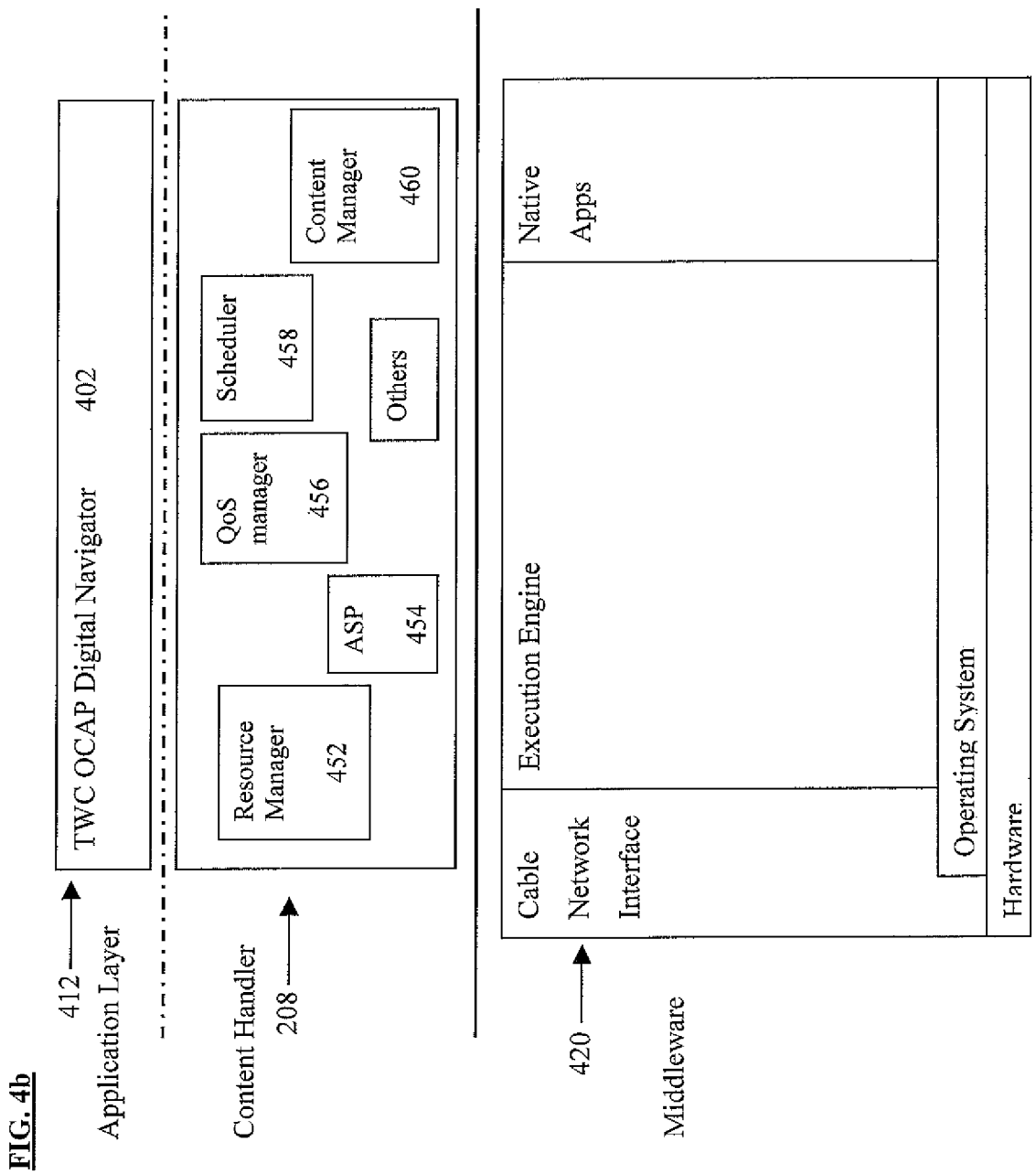
FIG. 4b is a functional block diagram of an exemplary OCAP stack of a CPE 106 implementing the content handler of the present invention.

FIG. 4b illustrates an exemplary embodiment of the OCAP stack 450 of a CPE 106 having a content handler 208 in accordance with the present invention. As illustrated, the content handler 208 sits between the OCAP digital navigator (ODN) application 402 and the OCAP middleware layer 420. As discussed above, other embodiments may utilize alternative navigation applications and/or alternative application platforms consistent with the present invention. Thus, it is appreciated that the present architecture is merely exemplary in nature and not intended to represent the only architecture for employing the content handler 208; other configurations are incorporated herein as well.

The content handler 208 comprises multiple algorithms in several buckets. The content handler 208 uses the various algorithms in conjunction with the buckets to perform various functions related to finding, selecting and transferring content. The buckets of the illustrated embodiment are associated with a resource manager 452, a QoS manager 456, an authorized service provider, ASP, 454, a scheduler 458, and a content manager 460. However, it is appreciated that buckets associated with other CPE 106 components may be incorporated consistent with the present invention. The buckets serve as intermediate locations where the various components may communicate with and transfer data with the content handler 208. The method by which the buckets are utilized will be discussed in greater detail below with regard to the functional aspects of the content handler 208.

The resource manager 452 described above as associated with the content handler 208 buckets may be similar to that described in co-owned, co-pending U.S. patent application Ser. No. 12/070,560, entitled "Multi-stream premises apparatus and methods for use in a content-based network"; which is hereby incorporated by reference in its entirety. The resource manager 452 functions in the present invention to, inter alia, process and maintain information from the RF front-end and utilize the information to monitor and to control the tune of the various tuner resources of the system (which may be controlled individually), as well as to route various individual content streams to various individual receiving devices simultaneously. The resource manager 452 with which the content handler 208 is in communication may be located on the CPE 106 having the content handler 208 or on a separate CPE 106.

The resource manager 452 arbitrates the hardware resources without requiring the OCAP application to have knowledge of those resources. It hides all the resource management from the OCAP application. The OCAP application only knows that it has content available from a single resource, but under this architecture, that single resource is representative of multiple resources.

The authorized service provider (ASP) 454 associated with the content handler 208 bucket comprises any entity which is adapted to send content to the CPE 106 having the content handler 208. The ASP 454 may comprise, inter alia, an HFC network entity 101, a distribution server 104, a VOD server 105, a digital rights management server, a broadcast switch server, or an edge switch device 194 associated with a hub.

The ASP 454 is an authorization engine that determines whether the client is able to access content. Again the content handler 208 assumes that responsibility so that all of these services are transparent to the application. The ASP 454 implements policies and enforces obligations with respect to the content.

The QoS manager 456 associated with the content handler 208 bucket described above may be similar to that described in co-owned, co-pending U.S. patent application Ser. No. 12/070,666, entitled "Apparatus and methods for utilizing statistical multiplexing to ensure quality of service in a network"; which is hereby incorporated by reference in its entirety. Accordingly, the QoS manager 456 associated with the content handler 208 bucket described above would comprise a computer application adapted to run on a CPE 106 (whether separate from the CPE 106 having the content handler 208, or not) and configure/implement a QoS policy for each content stream sent to a receiving device.

The QoS manager 456 in the stack relies on the QoS manager in the content handler 208 for the policy information and conflict resolution. The QoS manager 456 is a simple QoS organizer; all of the QoS definition, conflict resolution, etc. occurs at the content handler 208.

The content manager 460 described above as associated with the content handler buckets is a management entity, whether disposed at the headend or hub of the network, for management of media content received at the network.

The content manager 460 aggregates all of the content detected from the home network (and other sources) into a single interface (DVR EXT interface for OCAP) so that there are no additional requirements for the OCAP Digital Navigator.

The scheduler 458 described above is also a management entity, however, the scheduler 458 is disposed within the CPE 106 on which the content manager 208 is disposed. As will be discussed in greater detail below, the scheduler 458 manages the tuner resources 302 of the CPE 106 and reserves disk space on a storage device for programming that is pre-set to record. Thus, the scheduler 458 is charged with complex management functions; and, when more than one tuner 302 is present, the scheduler 458 streamlines their management. It is of note that in another embodiment, the abovementioned functionality of the scheduler 458 of the present invention may be incorporated into a resource manager or other management entity present on the CPE 106 having the content handler 208. Alternatively, the scheduler 458 of the present invention may further comprise the additional functionality generally attributed to a resource manager, as discussed above. Further, the scheduler 458 with which the content handler 208 is in contact may be the scheduler 458 disposed on the same CPE 106, or may be associated with the content handler 208 of a separate CPE 106.

Figure 5:
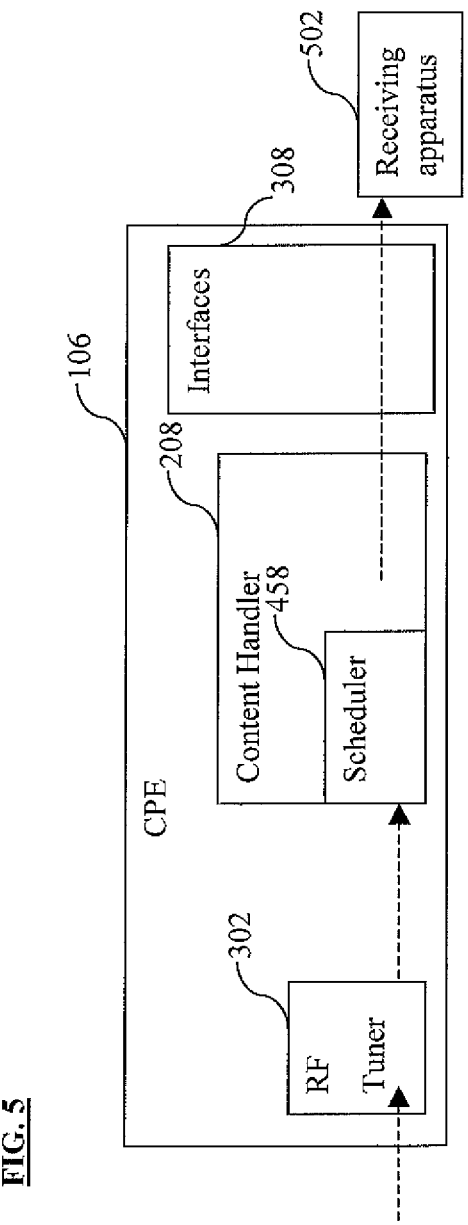
FIG. 5 is a functional block diagram of an exemplary client device implementing a content handler having a scheduler in accordance with the present invention.

Referring now to FIG. 5, a CPE 106 is shown having a content handler 208 and scheduler 458 in accordance with the present invention. As discussed above, the scheduler 458 manages the tuner 302 resource of the CPE 106, and in the exemplary embodiment, enables the content handler 208 to direct the content to a receiving apparatus 502. It is appreciated, however that several tuner resources 302 may be managed by a single scheduler 458. It is further understood that the receiving apparatus 502 of the present invention may comprise a display, storage, or other device. As will be discussed in greater detail below, the ability of the scheduler 458 to manage the tuner resources 302 is particularly advantageous in instances where a viewer would like to view or record a broadcast that will air at some future time (as discussed above). In that case, the scheduler is responsible for maintaining the request and, at the correct time, informing the content handler 208 that the content is available at the tuner.

Again the scheduler is abstracting the responsibility of scheduling recording events not only on local storage but also manages whether the recordings could be scheduled on a remote device over the home network.

Content Transfer Methodology—

The content handler 208 is adapted to communicate with the various other components within the CPE 106, as well as components within other CPEs and/or within other network entities, in order to facilitate the transfer of content between these entities. The various methods by which the content handler 208 promotes various content transfers are described in detail below.

Figure 6A:
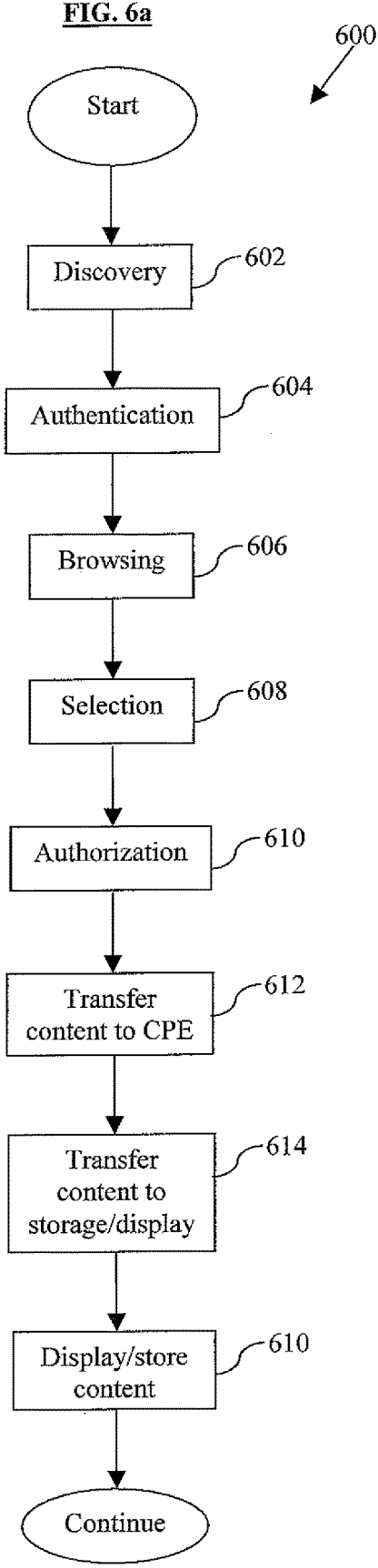
FIG. 6a is a logical flow diagram of an exemplary method of content transfer utilizing a content handler, according to the present invention, which is adapted to request stored content from a server CPE 106, a VOD sever, or a network PVR for display and/or storage.

Referring now to FIG. 6a, one exemplary embodiment of the generalized method 600 of content transfer utilizing the content handler 208 of the present invention is described. In the described embodiment, a CPE 106 having a content handler 208 functions as a renderer CPE 106b and requests stored content from a server CPE 106a or a VOD sever or a network PVR entity for display and/or storage (collectively referred to as a "server device"). The server device may or may not also advantageously comprise a content handler 208 as well.

At step 602 of the method 600, the content handler 208 of the renderer device 106b is allowed to discover the server device; or to discover the content handler 208 of the server device. The two devices thereby may form a client/server (e.g., renderer/server) relationship, although other relationships may be formed as well. This discovery 602 can occur via any number of approaches, including for example: (i) the renderer device 106b sending, through its content handler 208, a general or broadcast inquiry to all devices (and/or content handlers 208) in the network; or (ii) the server device advertising its capabilities unsolicited to the content handler 208 of the first device 106a. The server device may advertise its capabilities via its content handler 208 in one embodiment.

At step 604, the security capabilities and requirements of the renderer and server devices are checked in order to authenticate the devices. The authentication 604 may occur via a message exchange protocol, in a one-way or, alternatively, two-way authentication manner. Messages sent between the devices can be used to identify compatible security packages that each device possesses; e.g., AES or DES algorithms, public/private key pairs, support for certain security protocols, etc. Methods of authentication are well known in the communication arts and thus are not discussed further herein. In one embodiment, the method of authentication described in previously referenced U.S. patent application Ser. No. 11/592,054 is utilized consistent with the present invention.

At step 606, the renderer device 106b browses content associated with the sever device. It is noted that browsing of the server device may occur substantially through the device's content manager 208. Thus, the content handler 208 of the renderer CPE 106b comprises necessary hardware and software architecture to receive and process browsing requests by a user. The content handler 208 then communicates with the content handler 208 of the server CPE 106a, VOD server 105 or network PVR; or alternatively with another management entity disposed therein, via the aforementioned algorithms associated with the various buckets. In situations where the sever device has a content manager 208, that content manager 208 guides the browsing function in a manner similar to that of the content manager 208 of the renderer device 106b. This browsing may include review of titles, and optionally other information associated with the content (e.g., DRM or copyright requirements, file creation date, size, codec format, etc.). Such browsing functions may also allow for preview of the content by the requesting device, such as via a short pre-stored "trailer" or sample of the content or simply accessing the content file itself for a limited duration of time. Various preview technologies known to those of ordinary skill in the art may be used consistent with the invention.

The requesting (e.g., rendering) device 106b then indicates the choice of a particular content element (e.g., movie, MP3 file, etc.) title for viewing per step 608. In one embodiment, this is accomplished via the aforementioned functionality of the renderer device's 106b content manager 208. Once this selection 608 is communicated to the server device, it determines the requesting device's 106b authorization to receive the selected content (step 610), via the requesting device's content handler 208 and, in some instances, the server's content handler 208. The authorization may not necessarily coincide with the requesting device's 106b permissions to browse or preview content. For example, a content owner or MSO might restrict unlimited or full access to content to certain selected populations of prospective users (e.g., Time Warner Cable subscribers), whereas a larger subset of potential users can browse and preview, without having full access. This access differentiation can be used as the basis of a business model; i.e., enticing prospective subscribers or one-time purchasers by providing unlimited "teasers" or previews.

If access is allowed, then, at step 612, the selected content is formatted (if required) and then transferred over the designated communication channel from the serving device (the server CPE 106a, VOD server 105, or network PVR) to the requesting device's content handler 208. This is accomplished via placement of the content in the aforementioned buckets associated with the server device (the server CPE 106a, VOD server 105, or network PVR) on the renderer device's content handler 208. The buckets serve as reservoirs where content is placed during transfer. Thus, the management entity (content handler 208 or other) of the server CPE 106b, VOD server 105, or network PVR, accesses the requested content and transfer the content to an appropriate bucket in the content handler 208 of the renderer CPE 106b. In the instance where the CPE 106a utilizes a content handler 208 the requested content is accessed in a manner similar to that discussed below with regard to a self-search of storage.

At step 614, the content handler 208 transfers the content of the bucket associated with the sever device to the display and/or storage associated bucket of the rendering device 106b. Lastly, at step 616, the display and/or storage device is directed by the content handler 208 to display and/or store the content.

Figure 6B:
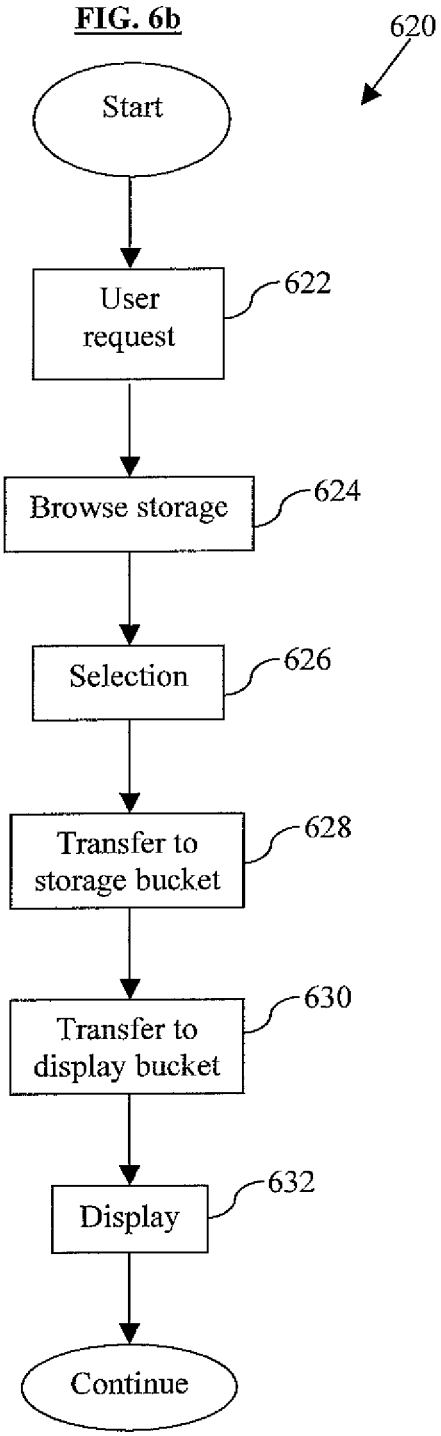
FIG. 6b is a logical flow diagram of another exemplary method of content transfer utilizing a content handler, according to the present invention, which is adapted to access content stored on the CPE itself.

Referring now to FIG. 6b, a second exemplary embodiment of the generalized method 620 of content transfer utilizing the content handler 208 of the present invention is described. In the described embodiment, a CPE 106 having a content handler 208 is able to access content stored on the CPE 106 itself. The method 620 comprises first, at step 622, receiving a user request within the content handler 208. The user request is generally accomplished by a selection on a user's remote control, etc. Accordingly, the content handler 208 comprises the necessary hardware and software architecture to receive and process the user request. The content handler 208 may also optionally authenticate the request as being from a permissible user. Then, at step 624, the content handler 208 utilizes one of the aforementioned algorithms to access the storage device and browse the contents. Once located, appropriate content is selected (step 626); an authorization may also optionally occur, wherein the content handler 208 may authorize the specific user to retrieve the content, e.g. when the content his protected or otherwise. At step 628, the content handler 208 directs the storage device to transfer the requested content to its associated bucket. Then, at step 630, the content handler 208 transfers the requested content from the storage device bucket to a bucket associated with a display device. Finally, at step 632, the content handler 208 directs the display device to display the content.

Referring now to FIG. 6c, the method 640 by which the content handler 208 enables a user to view and/or record content which is presently broadcast is given.

In the instance that the request is made of an entity separate from the CPE 106 itself, such as to a separate server CPE 106a, a VOD server 105, or a network PVR entity (collectively referred to as a "server device"), pathway (A1)

dictates that, first, the content handler 208 of the requesting device 106 must discover, at step 642, the server device from which content is requested. It is appreciated that the server devices may comprise their own content handlers 208, and where this is true, discovery 642 comprises discovery of the content handler 208. The discovery function 642 of the content handler(s) 208 is accomplished in a manner similar to that described above. Also as described above, the two devices may form a client/server (e.g., renderer/server) relationship, although other relationships may be formed as well. This discovery 642 can occur via any number of approaches, including for example: (i) the content handler 208 directing the requesting device 106 to advertise its capabilities unsolicited to the server device; or (ii) the server device sending a general or broadcast inquiry to all devices 106 (and/or content handlers 208) in the network. The server device may send the inquiry via their content handler(s) 208 in one embodiment. The functioning of the content handler(s) 208 is accomplished in a manner similar to that described above.

Then, per step 644, the server device authenticates the requesting device by checking the security capabilities and requirements. The authentication may occur via several mechanisms, including, inter alia, those discussed above.

In the instance where the request is made of the CPE 106 itself, pathway (B1) is followed; it indicates that, at step 645, a user request to access the scheduler 458 is received. The scheduler 458, as discussed above, manages the tuner resources 302 of the CPE 106; and, as above, the content handler 208 comprises necessary hardware and software architecture to receive and process the user request.

Pathways (A1) and (B1) converge, at step 646 where browsing of the schedule of presently broadcast programs occurs. The schedule is accessible on the CPE 106 itself and/or on the sever device. It is noted that devices having a content manager 208, including inter alia, the CPE 106 advantageously utilize a scheduler 458 entity to facilitate browsing of the schedule. Thus, the content handler 208 must comprise necessary hardware and software architecture to receive and process browsing requests by a user.

The content handler 208 communicates with the content handler 208 of the server device; or alternatively with another management entity disposed therein, via the aforementioned algorithms associated with the various buckets. In situations where the server device has a content manager 208, that content manager 208 guides the browsing function in a manner similar to that described above, including review of titles, and optionally other associated information (e.g., DRM or copyright requirements, file creation date, size, codec format, etc.). Also as discussed above, the browsing functions may additionally allow for preview of the content by the requesting device, such as via a short pre-stored "trailer" or sample of the content, or simply accessing the content file itself for a limited duration of time.

Then, at step 648, the requesting device selects a particular content element (e.g., movie, MP3 file, etc.) for viewing. In one embodiment, this is accomplished via the aforementioned functionality of the device's content manager 208.

Where the content is requested of a server device, the selection must be communicated to the device, pathway (A2) indicates that, at step 650, the request must be authorized by the server device. Authorization 650 refers to the determination of the requesting device's 106b authorization to receive the selected content via the device's 106b content handler 208 and, in some instances, the server device's content handler 208. As discussed above, the authorization 650 may not necessarily coincide with the requesting device's 106 permissions to browse or preview content, thereby giving way to one or more business models; such as enticing prospective subscribers or one-time purchasers by providing unlimited "teasers" or previews.

If access is allowed, then, at step 652, the selected content is formatted (if required) and then transferred over the designated communication channel to the requesting device's 106b content handler 208. This is accomplished via placement of the content in the aforementioned buckets associated with the server device on the requesting device's 106b content handler 208. The buckets serve as reservoirs where content is placed during transfer. Thus, the management entity (content handler 208 or other) of the server device accesses the requested content and transfers the content to an appropriate bucket in the content handler 208 of the requesting CPE 106b (step 654).

At step 654 and per pathway (B2), where the request is made of the CPE 106 itself, the content handler 208 directs the transfer of the content to a display device associated bucket and/or a storage device associated bucket (depending on the user request). Next, at step 656, the content handler 208 directs the display device to display the content, and/or the storage device to store the content.

Figure 6D:
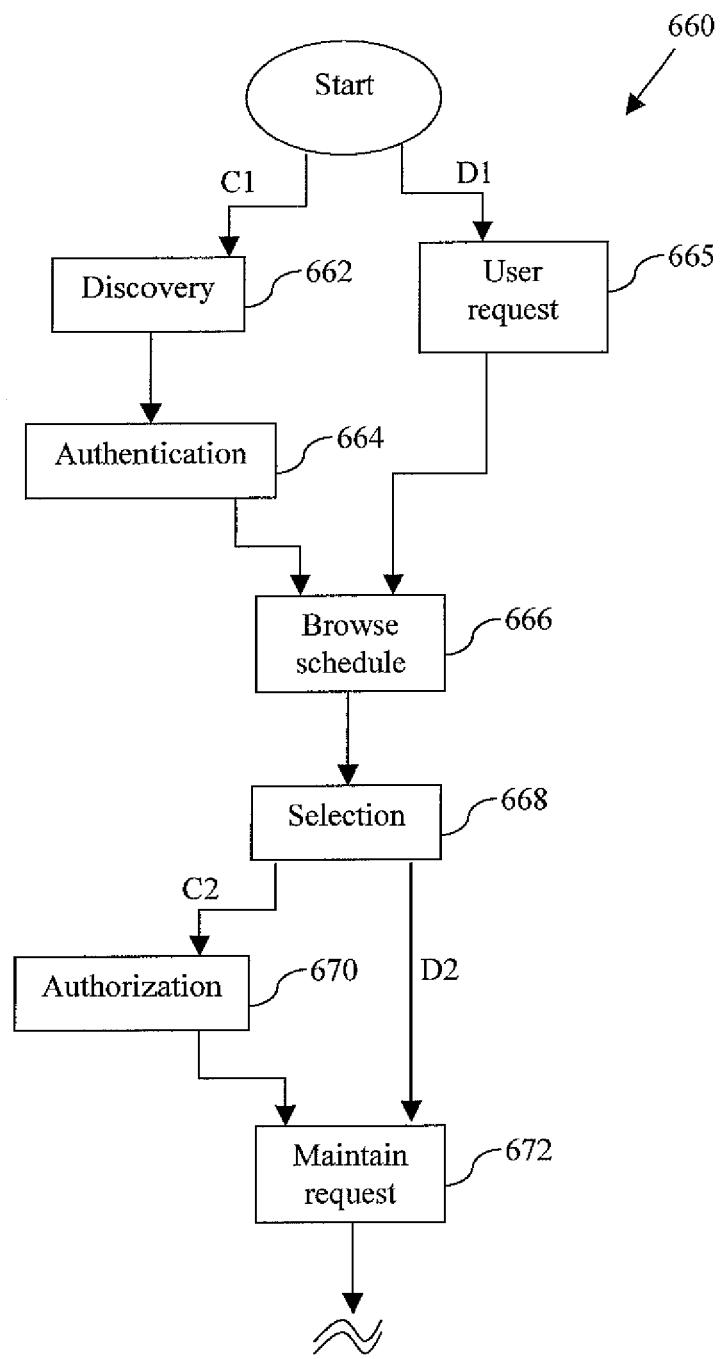
FIG. 6d is a logical flow diagram of another exemplary method of content transfer utilizing a content handler, according to the present invention, which is adapted to enable a user to view and/or record content which will broadcast at some time in the future.
Figure 6D:
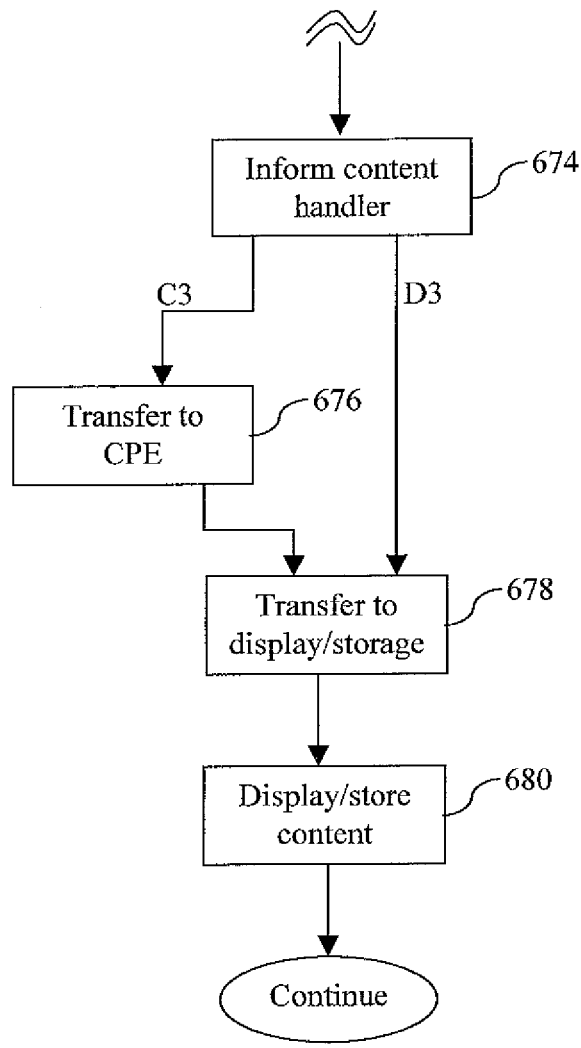

FIG. 6d illustrates the method 660 by which the content handler 208 enables a user to view and/or record content which is will broadcast at some future time.

In the instance that the request is made of an entity separate from the CPE 106 itself, such as to a separate "server" CPE 106a, a VOD server 105, or a network PVR entity (collectively referred to as a "server device"), pathway (C1) dictates that, first, the content handler 208 of the requesting device 106 must discover, at step 662, the server device from which content is requested. It is appreciated that if the server devices comprises a content handler 208, discovery 662 comprises discovery of the content handler 208. The discovery function 662 of the content handler(s) 208 is accomplished in a manner similar to that described above. Discovery 662 can occur via any of the aforementioned approaches, including for example: (i) the content handler 208 directing the requesting device 106 to advertise its capabilities unsolicited to a server device; or (ii) the server device sending a general or broadcast inquiry to all devices 106 (and/or content handlers 208) in the network (such as via a content handler 208).

Next, per step 664, the server device authenticates the requesting device 106b by checking the security capabilities and requirements. The authentication may occur via several mechanisms, including, inter alia, those discussed above.

In the instance where the request is made of the CPE 106 itself, pathway (D1) is followed; it indicates that, at step 665, a user request to access the scheduler 458 is received.

Pathways (C1) and (D1) converge, at step 666 where browsing of the schedule of future broadcast programs occurs. The schedule is accessible on the CPE 106 itself and/or on the sever device. It is noted that devices having a content manager 208, including inter alia, the CPE 106 advantageously utilizes a scheduler 458 entity to facilitate browsing of the schedule. Thus, the content handler 208 must comprise necessary hardware and software architecture to receive and process browsing requests by a user.

The content handler 208 communicates with the content handler 208 of the server device; or alternatively with another management entity disposed therein, and where the server device has a content manager 208, that content manager 208 guides the browsing function as discussed above.

Then, per step 668, the requesting device 106*b* selects a particular content element (e.g., movie, MP3 file, etc.) for viewing. In one embodiment, this is accomplished via the aforementioned functionality of the device's 106*b* content manager 208.

Where the content is requested of a server device, the selection must be communicated to the device, pathway (C2) indicates that, at step 670, the request must be authorized by the server device as discussed above.

If access is allowed, or per pathway (D2) in the instance the request is of the CPE 106 itself, the selected future content request is maintained by the scheduler 458 until the appropriate time for the content to broadcast arrives (step 672). At that time, per step 674, the content handler 208 is informed that the request is waiting and the content is available. This will be determined based at least in part on a determination of the day and time in which the content was set to broadcast (as determined by the schedule).

In the instance the content is requested from a server device, pathway (C3) indicates that at step 676, the selected content, once available, will be formatted (if required) and then transferred over the designated communication channel to the requesting device's content handler 208. This is accomplished via placement of the content in the aforementioned buckets associated with the server device on the requesting device's content handler 208. The buckets serve as reservoirs where content is placed during transfer. Thus, the management entity (content handler 208 or other) of the server CPE 106*a*, VOD server 105, or network PVR, accesses the requested content and transfer the content to an appropriate bucket in the content handler 208 of the requesting CPE 106*b*.

Next, at step 678, and, in the instance where the request is made to the CPE 106 itself pathway (D3) indicates, the content handler 208 directs the transfer of the content to a display device associated bucket and/or a storage device associated bucket (depending on the user request). Lastly, at step 680, the content handler 208 directs the display device to display the content, and/or the storage device to store the content.

Communication and Authentication—

As discussed above, the exemplary content handler 208 is adapted to facilitate various CPE 106 communication with other network CPE 106 and devices as well as internal communication. The communication thus leads to performance of various functions including, inter alia, scanning, advertising, authentication, browsing, selection, authorization, transfer, receipt and viewing content. Accordingly, methods by which the content handler 208 facilitates the data exchange between the entities may include a message exchange mechanism such as that previously referenced herein. The aforementioned communication may occur via a UPnP service such as that disclosed in co-owned, co-pending U.S. patent application Ser. No. 11/592,054 entitled "Methods and apparatus for premises content distribution" incorporated herein by reference in its entirety.

Contention Issues—

Contention is a condition that arises when two or more data attempts occur at the same time. The present invention contemplates that when these conflicts arise, the content handler 208 notifies the user. The user resolves contention issues by choosing one of the data to be displayed and/or stored; and the user's selection is understood and carried out by the content handler 208.

Figure 7A:
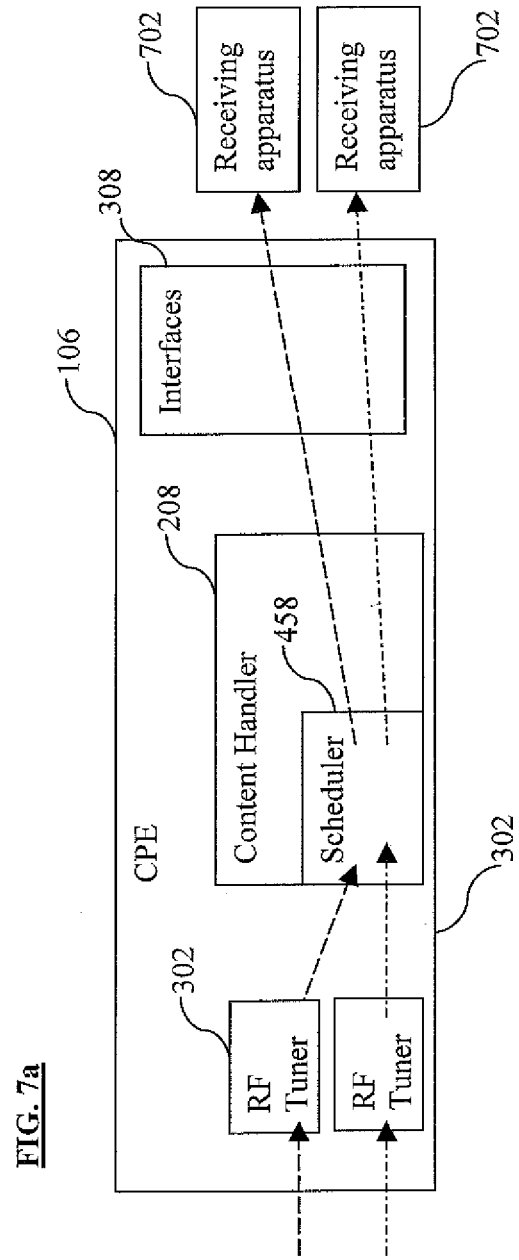
FIG. 7a is a functional block diagram of another exemplary embodiment of a client device having a content handler and a scheduler in accordance with the present invention.

FIG. 7*a* illustrates another embodiment of a CPE 106 having a content handler 208 and a scheduler 458 in accordance with the present invention. As indicated above, the scheduler 458 is utilized to manage the tuner resources. In the illustrated embodiment, the CPE 106 advantageously comprises two tuners. However, it is appreciated that more may be utilized consistent with the present invention. Specifically, having two tuners 302 enables the CPE 106 to receive content from two separate RF channels simultaneously; the scheduler 458 enables the content handler 208 to direct the transfer of the content received from the two data streams for display and/or storage to two separate receiving devices simultaneously.

Figure 7B:
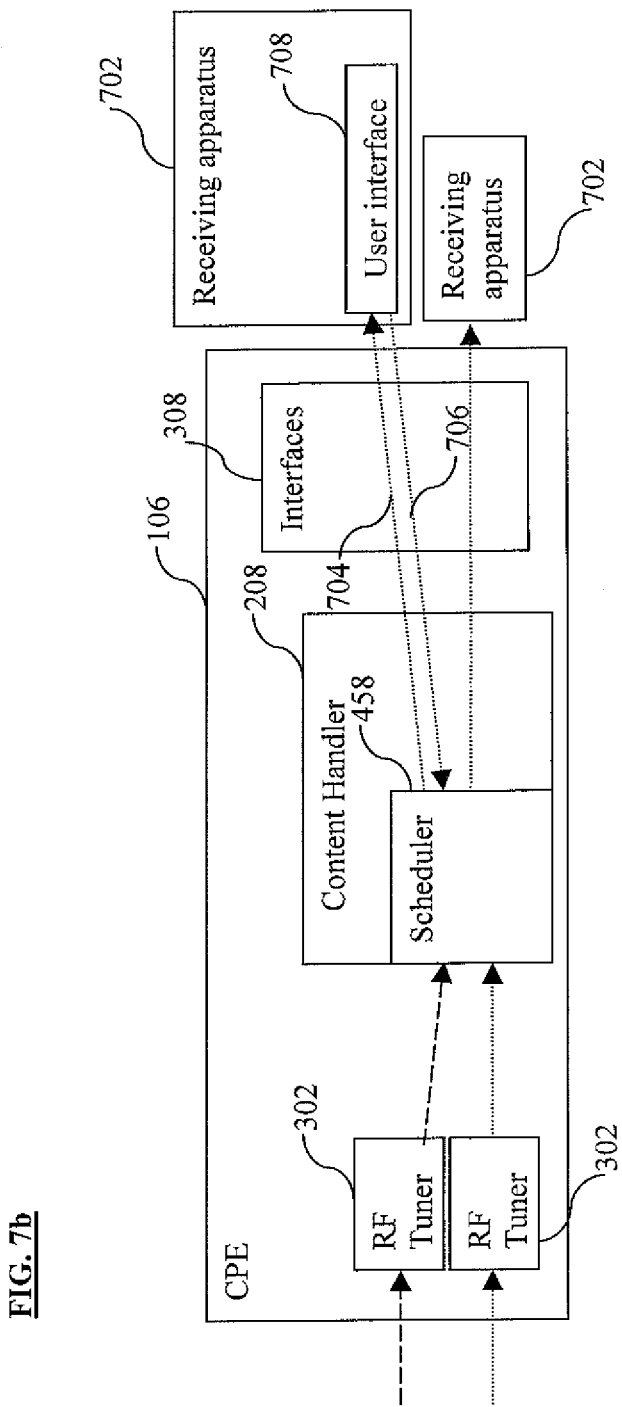
FIG. 7b is a functional block diagram of the exemplary client device of FIG. 7a utilizing a scheduler to resolve contention issues.

FIG. 7*b* illustrates the instance where one or more of the tuners is faced with a contention issue, such as where a user has requested to receive one content stream and there exists a pre-set request for a separate content stream in the scheduler 458 which would be implemented at the same time. It is also appreciated that contention issues may arise for alternate reasons or where more than two program streams are in contention; the scheduler 458 of the present invention is adapted to rectify these situations as well.

When a contention issue arises, the scheduler 458 identifies the tuner 302 with a contention issue and retrieves identification data about the program streams. The scheduler then notifies the user via the user interface 708 by sending a message 704 including identifying information about the contending program streams. The identifying information may advantageously comprise, inter alia, the title, running time, summary, or other details about the program stream content which will give the user adequate information to enable him/her to select which of the contending streams he/she would like to display or store. The user's selection will then be transmitted to the scheduler 458 via message 706 also containing identifying information at least for the selected program stream. The response message 706 is recognized and processed by the scheduler 458. Accordingly, the scheduler 458 enables the content handler 208 to direct the transfer of the selected content to the appropriate receiving device 602.

In another embodiment (not shown) it is further appreciated that when a contention issue arises, the scheduler 458 may be adapted to resolve the issue itself, according to pre-set rules, and not notify the user. Alternatively, the scheduler 458 may default to pre-set rules only if there is no response from the user after a set period of time. The pre-set rules will utilize the identifying information about the content stream that was previously gathered, at least in part, to facilitate the computer's selection. For example, the identifying information may comprise priority information including the date/time the program stream was selected for delivery. In one embodiment, program streams that were selected earlier may, according to the pre-set rules, be selected over newly selected streams. Alternatively, the rules may indicate that newly selected program streams be favored. In another example, the identifying information may comprise historical information about the frequency with which that particular content stream is requested by the CPE 106. Accordingly, the scheduler 458 chooses program streams which the user often requests over those that are less familiar. It is appreciated that other identifying information may be utilized with various pre-set rules to implement various selection criteria for the CPE 106, the above being merely exemplary.

A method 720 of resolving contention issues is given by FIG. 7*c*. As illustrated and discussed above, the method 720 comprises first, at step 722, identifying the tuner having a contention issue. At step 724, information regarding the program streams in contention is retrieved. As discussed above, the information retrieved may comprise, inter alia, details regarding the content associated with the program stream, priority information and/or historical information. In one embodiment, pathway E, the user is notified at step 726 and requested to make a selection. The notification will comprise at least permitting the user to view the retrieved information. In the instance where the user makes a selection, that information will be transmitted at step 730 via pathway F to a processing function of the content handler 208; however, if the user does not make a selection after a given period of time, via pathway G, the scheduler 458 is directed to select (step 728) and that selection will be transmitted at step 730 to the content handler 208. The selection by the scheduler 458 will be based at least in part on the retrieved information. In a second embodiment, pathway H, the user is not notified and instead, the scheduler 458 is adapted to select one of the contenting program streams (step 728). Selection by the scheduler 458 is accomplished via the aforementioned rules within the scheduler 458, and, at step 730 the scheduler's 458 selection is transmitted to a processing function of the content handler 208. Finally, at step 732, the content handler 208 will direct the transfer of the selected content to a receiving apparatus 702 for storage and/or display.

Software Architecture—

In another aspect of the invention, software adapted to enable a CPE 106 to further comprise a content handler 208 is given. The software described is advantageously adapted to permit the CPE 106 on which it is run to process requests for content, direct browsing of available content and direct a transfer of the requested content to a receiving apparatus 702. The receiving apparatus 702 may include, inter alia, a display device, a storage device, etc.

As noted above, the content handler 208 may be run on and adapted to manage content within only one device 106. Further, the content handler 208 is also adapted to run on one device 106 yet manage content transfer between the device 106 it is run on and a second device 106 which may or may not also comprise a content handler 208.

In one instance, the content handler 208 is adapted to receive requests from the device 106 on which it is being run and direct the browsing of a storage device attached thereto. It is noted that the storage device may comprise an internal storage device and/or may comprise storage devices external to the CPE 106 having the content handler 208. Accordingly, a user is permitted, via a content handler 208, to request to view stored content, browse the content and select content for display. The content handler 208 is adapted direct the above functions. The content handler 208 may also direct the search and display of content presently available to the device 106 via a network connection, including inter alia, an RF tuner, a wideband tuner, more than one RF tuner. The content handler 208 software may be her adapted to include scheduler 458 functionality. Accordingly, the scheduler 458 of the content handler 208 enables a user to browse content which will be available at a future time and set the CPE 106 to record and/or display that future content.

In a second instance, the content handler 208 is run on a server device 106a and requests are received from a separate, requesting device 106b. Accordingly, the user of the requesting device 106b requests to search the storage of the server device 106a. As discussed above, the request may be generated by the requesting device's 106b content handler 208. The request is received by the server device 106a s content handler 208, and processed. The content handler 208 also directs the search or browsing and once a selection is made, directs the transfer of content to the requesting device 106b. Accordingly, a user is permitted, via a content handler 208 on the server device 106a, to request to view stored content, browse the content and select content for display and/or storage. The content handler 208 software of the server device 106a may be further adapted to include scheduler 458 functionality. As discussed above, the scheduler 458 of the content handler 208 enables the user of the requesting device 106b to browse content which will be available at a future time to the server device 106a and set the server device 106a to record and/or transfer that future content to the requesting device 106b for storage and/or display when the future content becomes available.

In another instance, the content handler 208 is run on a requesting device 106b and requests are made to a separate server device 106a. Accordingly, the user of the requesting device 106b requests to search the storage of the server device 106a. As discussed above, the request may be processed and managed by the server device's 106a content handler 208. Once the content is received, the content handler 208 directs the transfer of content to the receiving apparatus 702. The content handler 208 software of the requesting device 106b may be further adapted to include scheduler 458 functionality. As discussed above, the scheduler 458 of the content handler 208 enables the user of the requesting device 106b to browse content which will be available at a future time to the server device 106a and set the server device 106a to record and/or transfer that future content to the requesting device 106b for storage and/or display when the future content becomes available.

Network Server Architecture—

It will be appreciated that, in another embodiment, various CPE 106 in a network may communicate with one overarching network server (not shown) having a content handler 208 consistent with the present invention. According to this embodiment, the various CPE 106 both inside and outside of a particular user/subscriber's premises may be permitted to browse, request, and receive content stored on the network server. It is further appreciated that the network CPE 106 may, in another embodiment, be permitted to browse, request and receive content on other CPE 106 on the network via the network server entity as well.

Business Methods and Operational "Rules" Engine—

In another aspect of the invention, an operational or business "rules" engine can be implemented consistent with the invention as a higher layer or supervisory process that imposes particular rules on the previously described server and client processes in order to produce desired business or operations goals. The rules engine can be considered an overlay of sorts to the more fundamental processes used to accomplish required device advertising/discovery, security package negotiation, browsing, etc.

In one embodiment, this rules engine is implemented a computer programs or programs running on one or more of the CPE 106 that are party to a renderer-server transaction. As previously discussed, the server CPE 106a, renderer CPE 106b, VOD server 105 and/or PVR entity can implement logic to exchange messages and negotiate a common security framework that can be used for communication. This allows for mixing and matching of different vendor's equipment and overcomes the "single source" economic inefficiency introduced by proprietary conditional access and DRM solutions. The selection and utilization of the particular aspect of this common security framework, as well as other features such as the communication channels that may be used to effectuate scanning, authentication, browsing, and content transfer, may be governed by the higher layer "rules" processes as well.

The supervisory rules may comprise a separate entity or process which is substantially autonomous of the network operator, and may be fully integrated within other processing entities (such as the aforementioned content handler 208). Alternatively, the rules engine may be controlled via e.g., a remote MSO user interface 708 such as a GUI on a PC connected to the relevant device via a network interface, so as to allow the MSO to adjust or reprogram aspects of the rules engine, reload it with updates, etc.

Included within these rules are the implementation of security management policies that can increase or enhance: (i) content security or protection, (ii) network optimization and reliability, (iii) subscriber or user satisfaction, (iv) profit or revenue, and so forth.

For example, one rule implemented by the rules engine may comprise only providing certain types or program recording and/or distribution features to certain subscribers or classes of subscribers. The subscriber server CPE 106*a*, VOD server 105, and/or PVR entity may possess UPnP capability for interfacing with and transmitting content to a connected device for example, but the ability to transfer such protected content out of the server entity (CPE 106*a*, VOD server 105, and/or PVR entity) not be made available to such subscribers unless they met certain criteria (e.g., "premium" subscription, etc.).

Moreover, premium subscribers might be given a greater scope of options and choices; e.g., the ability to use a wider range of CPE (e.g., new DSTBs introduced in the retail market), while more basic subscribers are limited as to the type of device they may use as part of their subscription.

The present invention also contemplates the partial disclosure of content by a server CPE based on the level of authentication achieved by a renderer device. These levels of authentication may be controlled by the network operator, such as where higher levels of access or authentication are provided to subscribers or users with greater privileges. For example, when a renderer is not authenticated at all, the server entity (CPE 106*a*, VOD server 105, and/or PVR entity) may be configured to not give the requesting CPE any access to browsing protected material of any kind. At a higher tier of authentication or permission, the server may give access to the renderer to only a subset of titles, or alternatively all titles, but without access to the substantive content itself (other than perhaps a trailer or preview).

Similarly, a server entity may be configured by the rules engine to only provide access to content that originated from a cable WAN (e.g., HFC 101) for requesting devices that authenticate themselves as a "cable operator authorized renderer", or provide some other indicia of trust for that particular type or origin of content.

Further, different rules or grades of access can be provided to different types of content; e.g., content that is more mature or has been in distribution for a longer period of time may be viewed as less risky from a theft or unauthorized copying standpoint, and hence the authentication level or permissions required to browse and even transfer that content may be relaxed somewhat as compared to new release content.

The server entity (CPE 106*a*, VOD server 105, and/or PVR entity) may also segregate content (based, e.g., on AssetContentID or a similar variable) and apply different access and transfer rules based on such segregation. For example, all content with an AssetContentID of a certain form might require extended permissions (e.g., parental control) and authentication before that content can be previewed or transferred.

The server may also be advantageously used as an advertisement platform to provide occasional browsing access to showcased content to attract a user to purchase additional titles, or a subscription or membership.

The business rules engine previously described, or another functional entity within the network, may also be used to implement and enforce so-called "copy once" rules or protection mechanisms of the type well known in the content reproduction and distribution arts. Similar rules such as e.g., "never copy" and "no more copying" can also be implemented as desired. For example, the Philips Video Content Protection System (VCPS), which enables content delivered over a cable network to be marked as "copy once", meaning it can be burned onto VCPS-enabled DVD+R and DVD-RW disks, although many other types of systems and rules are envisaged for use within the current invention.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of sharing protected content within an ad hoc network, comprising:

establishing ad hoc a communication channel between a first entity and a second entity, said first entity and said second entity forming said ad hoc network when said communication channel is established;

selectively allowing at least said first entity to browse a schedule of content of said second entity, said schedule of content provided by a scheduler in data communication with said first entity, said schedule of content comprising at least a listing of content and a future time at which said content is to be broadcasted at said second entity but not directly broadcasted at said future time to said first entity without said established communication channel between said first entity and said second entity, said browsing directed at least in part by a computer program running on said first or said second entity;

receiving a request at said first entity for at least a portion of said content to be received from said second entity;

in response to said request at said first entity, automatically reserving one or more resources available at least in part to said second entity for use at said future time listed in said schedule of content, said one or more resources available at least in part to said second entity facilitating reception of said requested content at said first entity; and after said future time, selectively transferring at least said portion of said requested content from at least said second entity to said first entity, said transferring directed at least in part by said computer program running on said first or said second entity.

2. The method of claim 1, wherein said act of transferring at least said portion of said requested content comprises transferring at least said portion of said requested content to a storage medium or a display apparatus.

3. The method of claim 1, further comprising authenticating at least one of: (i) said first entity to said second entity, and (ii) said second entity to said first entity, wherein said act of authenticating is accomplished by said computer program running on said first entity or said second entity.

4. The method of claim 3, wherein said act of transferring at least said portion of said requested content is based, at least in part, on said act of authenticating.

5. The method of claim 1, wherein said act of establishing comprises causing said first entity and said second entity to be placed in data communication via at least a plug-and-play data interface.

6. The method of claim 1, wherein said act of establishing comprises causing said first entity and said second entity to be placed in data communication via a wireless interface wherein one of said first and second entities performs a first role and said second entity performs a second role with respect to said communication channel.

7. The method of claim 6, wherein said first role comprises a server station, and said second role comprises a renderer station.

8. The method of claim 6, wherein said first role comprises an access point (AP), and said second role comprises a station (STA), said AP providing data connectivity to at least one other entity other than said STA.

9. The method of claim 1, wherein said act of reserving one or more resources available at least in part to said second entity in response to said request at said first entity comprises one or more of:
   using a tuner of said second entity for a period of time;
   reserving a storage device of said second entity; and
   reserving a data connection for said second entity to a content delivery network.

10. The method of claim 1, further comprising maintaining said request until arrival of said future time for broadcast of said content.

11. The method of claim 10, further comprising, after arrival of said future time for broadcast of said content, informing said second entity that said request is waiting and said content is available.

12. The method of claim 11, further comprising, after informing said second entity that said request is waiting and said content is available, formatting said content prior to transferring to said first entity over said communication channel.

13. A method of sharing protected content within an ad hoc network, comprising:
   establishing ad hoc a communication channel between a renderer device and a content source device, said renderer device and said content source device being disposed at an edge of a content distribution network and utilizing said communication channel for communications over said ad hoc network;
   authenticating said renderer device to said content source device using a computer program running on said renderer device or said content source device in order to verify authorization for transfer of content from said content source device to said renderer device;
   based at least in part on said authentication, selectively allowing at least said renderer device to browse a schedule of content of said content source device provided by a scheduler in data communication with said content source device, said schedule of content comprising at least a listing of content and a future time at which said content is to be broadcasted, said browsing directed at least in part by said computer program running on said renderer device or said content source device;
   receiving at said renderer device a request for at least a portion of said content from said content source device;
   based at least in part on said request at said renderer device and said authentication, reserving one or more resources available at least in part to said content source device for use at said future time listed in said schedule of content, said one or more resources available at least in part to said content source device facilitating reception of said requested content at said renderer device; and
   at or after said future time, selectively transferring at least said portion of said requested content from said content source device to said renderer device, said transferring directed at least in part by said computer program.

14. The method of claim 13, wherein said renderer device comprises one or more of: (i) a storage apparatus, and (ii) a display apparatus.

15. The method of claim 13, wherein said act of establishing comprises causing said renderer device and said content source device to be placed in data communication via at least a plug-and-play data interface.

16. The method of claim 13, wherein said computer program comprises an OpenCable Application Platform (OCAP) compliant JAVA-based middleware application.

* * * * *